(12) United States Patent
Yoshino et al.

(10) Patent No.: US 10,841,685 B2
(45) Date of Patent: Nov. 17, 2020

(54) RECEIVER AND RF SIGNAL SUPPLY APPARATUS

(71) Applicant: Sony Corporation, Tokyo (JP)

(72) Inventors: Yoshitaka Yoshino, Tokyo (JP); Satoru Tsuboi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/593,879

(22) Filed: Oct. 4, 2019

(65) Prior Publication Data

US 2020/0145746 A1 May 7, 2020

Related U.S. Application Data

(63) Continuation of application No. 16/087,304, filed as application No. PCT/JP2017/012420 on Mar. 27, 2017, now abandoned.

(30) Foreign Application Priority Data

Mar. 29, 2016 (JP) .................. 2016-065397

(51) Int. Cl.
*H01Q 1/46* (2006.01)
*H04B 1/16* (2006.01)
(Continued)

(52) U.S. Cl.
CPC ....... *H04R 1/1041* (2013.01); *G06F 13/4282* (2013.01); *H01Q 1/46* (2013.01);
(Continued)

(58) Field of Classification Search
CPC ................ H04R 1/1041; H04R 1/1033; H04R 2420/09; G06F 13/4282; G06F 2213/0042;
(Continued)

(56) References Cited

U.S. PATENT DOCUMENTS

| 2010/0144293 A1 | 6/2010 | Yoshino et al. |
| 2010/0239029 A1 | 9/2010 | Komori et al. |

(Continued)

FOREIGN PATENT DOCUMENTS

| EP | 2479841 A1 | 7/2012 |
| EP | 2819311 A1 | 12/2014 |

(Continued)

OTHER PUBLICATIONS

Rogers A., Summary of USB Type-CTM, Microchip Technology Inc., 2015, 20 pages. (Year: 2015).*

(Continued)

*Primary Examiner* — Paul Kim
*Assistant Examiner* — Friedrich Fahnert
(74) *Attorney, Agent, or Firm* — Wolf, Greenfield & Sacks, P.C.

(57) ABSTRACT

A receiver includes a connector into which a plug can be inserted in either of one state of a surface and a rear surface and another state in which the surface and the rear surface are inverted. A first array including a plurality of pins and a second array including a plurality of pins are formed in the connector nearly in parallel, and both or one of a first pin included in the first array and a second pin included in the second array and positioned at a diagonal of the first pin is set for input use of an RF signal.

14 Claims, 18 Drawing Sheets

(51) Int. Cl.
  *H04B 1/18*   (2006.01)
  *H01R 24/60*  (2011.01)
  *H04R 1/10*   (2006.01)
  *G06F 13/42*  (2006.01)

(52) U.S. Cl.
  CPC .............. *H01R 24/60* (2013.01); *H04B 1/16* (2013.01); *H04B 1/18* (2013.01); *H04R 1/1033* (2013.01); *G06F 2213/0042* (2013.01); *H04R 2420/09* (2013.01)

(58) Field of Classification Search
  CPC ... H01Q 1/46; H04B 1/16; H04B 1/18; H01R 24/60
  USPC .......................................................... 381/74
  See application file for complete search history.

(56) References Cited

U.S. PATENT DOCUMENTS

| | | |
|---|---|---|
| 2010/0248671 A1 | 9/2010 | Yoshino et al. |
| 2011/0235844 A1 | 9/2011 | Yoshino |
| 2012/0050133 A1 | 3/2012 | Yoshino et al. |
| 2012/0189068 A1* | 7/2012 | Korner ................ H01Q 1/2275 375/259 |
| 2013/0009835 A1 | 1/2013 | Yoshino et al. |
| 2015/0055020 A1* | 2/2015 | Yoshino ................ G06F 13/385 348/706 |
| 2015/0261714 A1 | 9/2015 | Talmola |
| 2019/0110119 A1 | 4/2019 | Yoshino et al. |

FOREIGN PATENT DOCUMENTS

| | | |
|---|---|---|
| JP | 2012-244327 A | 12/2012 |
| JP | 2013-131879 A | 7/2013 |
| JP | 2013-201750 A | 10/2013 |
| JP | 2016-001916 A | 1/2016 |
| WO | WO 2013/125347 A1 | 8/2013 |

OTHER PUBLICATIONS

Extended European Search Report dated Mar. 22, 2019, in connection with European Application No. 17774956.1.
International Search Report and Written Opinion and English translations thereof dated Apr. 25, 2017 in connection with International Application No. PCT/JP2017/012420.
International Preliminary Report on Patentability and English translation thereof dated Oct. 11, 2018 in connection with International Application No. PCT/JP2017/012420.
Universal Serial Bus Type-C Cable and Connector Specification, Audio Adapter Accessory Mode, Revision 1.2, USB 3.0 Promoter Group, Mar. 25, 2016, pp. 194-198.
Rogers A., Summary of USB Type-C™, Microchip Technology Inc., 2015, 20 pages.
U.S. Appl. No. 12/631,186, filed Dec. 4, 2009, Yoshino et al.
U.S. Appl. No. 12/720,302, filed Mar. 9, 2010, Komori et al.
U.S. Appl. No. 12/724,693, filed Mar. 16, 2010, Yoshino et al.
U.S. Appl. No. 13/050,396, filed Mar. 17, 2011, Yoshino.
U.S. Appl. No. 13/320,065, filed Nov. 11, 2011, Yoshino et al.
U.S. Appl. No. 13/635,933, filed Sep. 19, 2012, Yoshino et al.

* cited by examiner

FIG. 3A

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | $V_{BUS}$ | CC1 | D+ | D− | SUB1 | $V_{BUS}$ | RX2− | RX2+ | GND |
| GND | RX1+ | RX1− | $V_{BUS}$ | SUB2 | D− | D+ | CC2 | $V_{BUS}$ | TX2− | TX2+ | GND |
| B12 | B11 | B10 | B9 | B8 | B7 | B6 | B5 | B4 | B3 | B2 | B1 |

FIG. 3B

| A12 | A11 | A10 | A9 | A8 | A7 | A6 | A5 | A4 | A3 | A2 | A1 |
|---|---|---|---|---|---|---|---|---|---|---|---|
| GND | RX2+ | RX2− | $V_{BUS}$ | SUB1 | D− | D+ | CC | $V_{BUS}$ | TX1− | TX1+ | GND |
| GND | TX2+ | TX2− | $V_{BUS}$ | $V_{CONN}$ | | | SUB2 | $V_{BUS}$ | RX1− | RX1+ | GND |
| B1 | B2 | B3 | B4 | B5 | B6 | B7 | B8 | B9 | B10 | B11 | B12 |

RECEIVER AND RF SIGNAL SUPPLY APPARATUS

CROSS REFERENCE TO RELATED APPLICATIONS

The present application claims the benefit under 35 U.S.C. § 120 as a continuation application of U.S. application Ser. No. 16/087,304, filed on Sep. 21, 2018, which is a U.S. National Stage Application under 35 U.S.C. § 371, based on International Application No. PCT/JP2017/012420, filed Mar. 27, 2017, which claims priority to Japanese Patent Application JP 2016-065397, filed Mar. 29, 2016, each of which is hereby incorporated by reference in its entirety.

TECHNICAL FIELD

The present technology relates to a receiver that receives, for example, television broadcasting and an RF signal supply apparatus that supplies an RF signal (high-frequency signal) to the receiver.

BACKGROUND ART

In the case of using information terminal equipment that is not equipped with an RF connector, any input/output terminal is generally allowed to have an input function of an RF signal. For example, an earphone cable connected to an earphone terminal is allowed to serve as an antenna. However, the earphone terminal is a relatively large terminal in order to insert a mini plug with a diameter of 3.5 mm, and therefore the above is disadvantageous for thinning of equipment.

To solve the above problem, as described in PTL 1, it is proposed that a USB (Universal Serial Bus) connector is used as an RF input. Specifically, a configuration in which a USB terminal (type A) and a USB terminal (type B) are provided at both ends of a coaxial shield line with a predetermined length is described. Further, in PTL 2, an example of a USB connector SMA (Sub Miniature Type A) conversion cable is described. In PTL 1 and PTL 2 described above, an identification pin is used as an antenna input.

CITATION LIST

Patent Literature

[PTL 1]
 Japanese Patent Laid-Open No. 2012-244327
[PTL 2]
 Japanese Patent Laid-Open No. 2016-001916

SUMMARY

Technical Problem

In the descriptions of PTL 1 and PTL 2, the USB terminal is specified by an existing standard and a surface and a rear surface in the case of inserting a USB plug into the USB connector are fixed. However, recently, a reversible connector in which a direction of a surface and a rear surface is not restricted is being used. A USB Type-C connector, a Lightning connector, or the like is a reversible connector.

With such a reversible connector, in the case in which the surface and the rear surface of the plug are replaced with each other, when antenna input terminals are fixed as in PTL 1 or PTL 2, there arises a problem that an antenna input cannot be supplied.

Accordingly, an object of the present technology is to provide a receiver capable of receiving an RF signal and an RF signal supply apparatus capable of supplying an RF signal without trouble when using a reversible connector.

Solution to Problem

A receiver according to the present technology has a connector into which a plug can be inserted in either of one state of a surface and a rear surface and another state in which the surface and the rear surface are inverted. A first array including a plurality of pins and a second array including a plurality of pins are formed in the connector nearly in parallel, and both or one of a first pin included in the first array and a second pin included in the second array and positioned at a diagonal of the first pin is set for input use of an RF signal.

An RF signal supply apparatus according to the present technology has a plug that can be inserted into a connector in either of one state of a surface and a rear surface and another state in which the surface and the rear surface are inverted; and a cable that supplies an RF signal to the plug. A first array including a plurality of pins and a second array including a plurality of pins are formed in the plug nearly in parallel, and both or one of a first pin included in the first array and a second pin included in the second array and positioned at a diagonal of the first pin is set for supply use of the RF signal.

Advantageous Effect of Invention

According to at least one embodiment, it is possible to supply an RF signal to a receiver without trouble in either of one state of a surface and a rear surface of a plug and another state in which the surface and the rear surface of the plug are inverted. Note that the effects described here are not necessarily restrictive, and any of the effects described in the present technology are applicable. Further, content of the present technology should not be limitedly interpreted by effects exemplified in the following descriptions.

BRIEF DESCRIPTION OF DRAWINGS

FIG. 3A shows a schematic diagram illustrating a pin array in the case of viewing the receptacle from a front face, and FIG. 3B shows a schematic diagram illustrating a pin array in the case of viewing the plug from a front face.

DESCRIPTION OF EMBODIMENTS

Figure 1A:
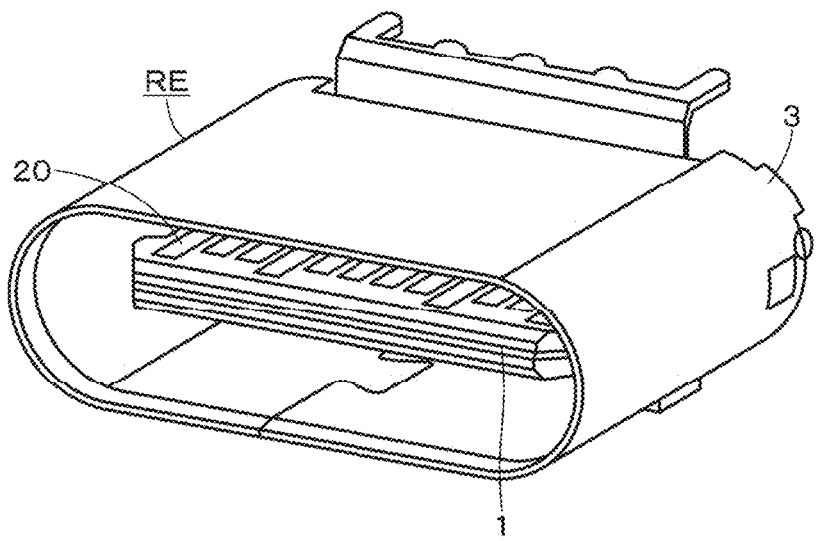
FIG. 1A is a perspective diagram used to describe an example of a receptacle.

The embodiments described below are preferred specific examples of the present technology and technically preferable various limitations are imposed. However, unless there are descriptions to limit the present technology in particular in the following description, the scope of the present technology shall not be limited to these embodiments.

It is noted that the descriptions of the present technology will be given in the following order.
<1. First Embodiment>
<2. Second Embodiment>
<3. Third Embodiment>
<4. Modification Example>

1. First Embodiment

A first embodiment is applied to a case in which, for example, television broadcasting is received by using a mobile terminal such as a smartphone or a tablet and uses a connector specified by a USB Type-C standard as a connector. A shape of the USB Type-C connector (hereinafter, appropriately referred to as a receptacle) is a connector as small as a micro USB and is suitable for use in a receiver of the mobile terminal or the like. Further, in the case where the television broadcasting is received by using the mobile terminal, a headset (headphones) is used to hear sound of programs in many cases.

In the USB Type-C standard, a special operation mode (audio adapter accessary mode) for supplying a headset with an analog audio signal is determined as described below. If the audio adapter accessary mode is used, at the time of receiving the television broadcasting by the mobile terminal, sound can be heard by using the headset. In consideration of the above point, an RF signal, for example, an antenna signal is supplied to the mobile terminal in the audio adapter accessary mode. Further, performing high-speed data transmission and antenna-signal transmission at the same time has an influence exerted on both, which is not preferable. It is preferable that the antenna signal is transmitted while transmitting such a signal with relatively low frequency as an analog audio signal.

In the audio adapter accessary mode, a USB Type-C plug and a jack for audio are connected through a cable. Transmission paths of four analog signals, that is, a left channel signal (left), a right channel signal (right), a microphone signal (microphone), and an analog ground signal (ground) are formed. In the present embodiment of the present technology, a ground is used as the transmission path of the RF signal. Further, it is possible to constitute an antenna cable by using, as the cable, a cable having a shield line made of a braided copper wire.

The above-described technical concept of the first embodiment is similar to those in the other embodiments. However, the present technology is also applicable to a reversible specification, for example, Lightning, other than the USB Type-C standard. That is, in either of one state of a surface and a rear surface and another state in which the surface and the rear surface are inverted, it is possible to insert a plug into a receptacle. In addition, in the present specification, terms of the RF signal and the antenna signal are used in the meaning including an output signal (including an amplified signal) from an antenna itself, the antenna signal from external antennas supplied via an RF connector, a wirelessly transmitted signal obtained by converting frequencies of the antenna signal, and the like.

"Regarding the USB Type-C"

Figure 1B:
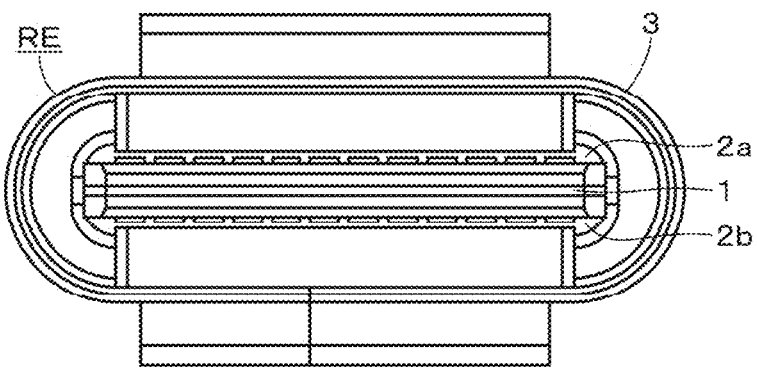
FIG. 1B is an elevation diagram used to describe the example of the receptacle.

The USB Type-C as an example of a reversible connector will be described prior to the description of the present technology. FIG. 1A shows a perspective diagram viewed from a front face of a USB Type-C receptacle RE, and FIG. 1B shows an elevation diagram viewed from the front face of the USB Type-C receptacle RE. A first array 2a and a second array 2b each including twelve contact points (pins) are formed nearly in parallel on the opposite surfaces of an intermediate substrate 1. The intermediate substrate 1, the first array 2a, the second array 2b, and the like are stored within a shell 3.

Figure 2A:
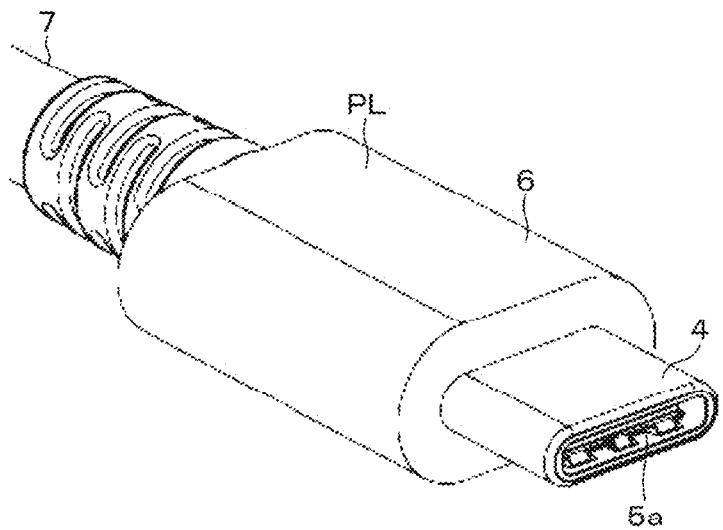
FIG. 2A is a perspective diagram used to describe an example of a plug.
Figure 2B:
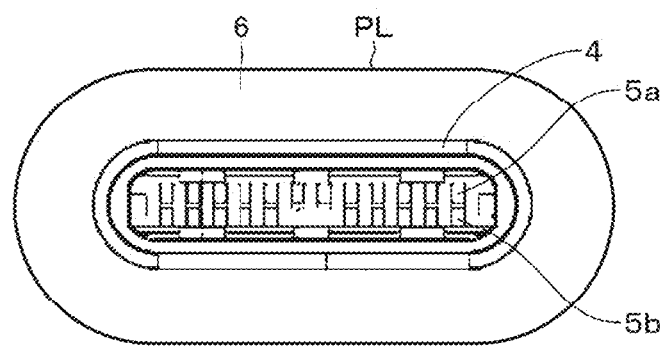
FIG. 2B is an elevation diagram used to describe the example of the plug.

FIG. 2A illustrates a perspective diagram of a plug interface (hereinafter, simply referred to as a plug) PL connected to the receptacle, and FIG. 2B illustrates an elevation diagram of the plug PL. A first array 5a and a second array 5b each including spring contact points (pins), which are made contact with the contact points of the first array 2a and the second array 2b when the receptacle is inserted, are formed nearly in parallel within a shell 4 of the plug. Further, a rear portion of the shell 4 is covered with a synthetic resin 6 and a cable 7 is derived out. The first array 5a and the second array 5b each include twelve spring contact points.

FIG. 3A illustrates a pin array viewed from the front face of the receptacle and FIG. 3B illustrates a pin array viewed from the front face of the plug. In each of the pin arrays, twelve pins of A1 to A12 are arrayed in an upper stage and twelve pins of B1 to B12 are arrayed in a lower stage. The upper stage is referred to as an A side and the lower stage is referred to as a B side. In the case where the plug is inserted into the receptacle in a state in which the A side is on the upper side, pins having the same names (e.g., A1-A1, B12-B12, . . . ) are connected to each other. This connection is referred to as a forward connection. However, if the surface and the rear surface are inverted due to twist, etc. of the cable, the plug is inserted into the receptacle in a state in which the B side is on the upper side. In this case, the B side of the plug is connected to the A side of the receptacle and the A side of the plug is connected to the B side of the receptacle. This connection is referred to as a reverse connection. The forward connection or reverse connection of a plug as described above is detected and a connection relation between the pins is set in accordance with the connection state. Accordingly, either connection can be established.

In the USB Type-C, a pin assignment is specified as follows.

A side
A1: GND: Ground
A2: SSTXp1: A plus side of the data transmission specified by USB 3.1
A3: SSTXn1: A minus side of the data transmission specified by USB 3.1
A4: VBUS: Bus power
A5: CC1: Configuration channel
A6: Dp1 (or D+): A plus side of the data transmission specified by USB 2.0
A7: Dn1 (or D−): A minus side of the data transmission specified by USB 2.0
A8: SBU1: Sideband use
A9: VBUS: Bus power
A10: SSRXn2: A minus side of the data transmission specified by USB 3.1
A11: SSRXp2: A plus side of the data transmission specified by USB 3.1
A12: GND: Ground
B side
B12: GND: Ground
B11: SSRXp2: A plus side of the data transmission specified by USB 3.1
B10: SSRXn2: A minus side of the data transmission specified by USB 3.1
B9: VBUS: Bus power
B8: SBU2: Sideband use
B7: Dn2 (or D+): A plus side of the data transmission specified by USB 2.0
B6: Dp2 (or D−): A minus side of the data transmission specified by USB 2.0
B5: CC2: Configuration channel
B4: VBUS: Bus power
B3: SSTXn2: A minus side of the data transmission specified by USB 3.1
B2: SSTXp2: A plus side of the data transmission specified by USB 3.1
B1: GND: Ground The USB Type-C is a reversible connector capable of being inserted into the receptacle whether the surface or the rear surface is on the upper side, and is a next-generation connector that achieves both power delivery and high-speed transmission. In addition to the above-described functions, there is a standard referred to as the audio adapter accessary mode for this connector. This recording is a standard that enables an analog audio signal to pass through.

Figure 4:
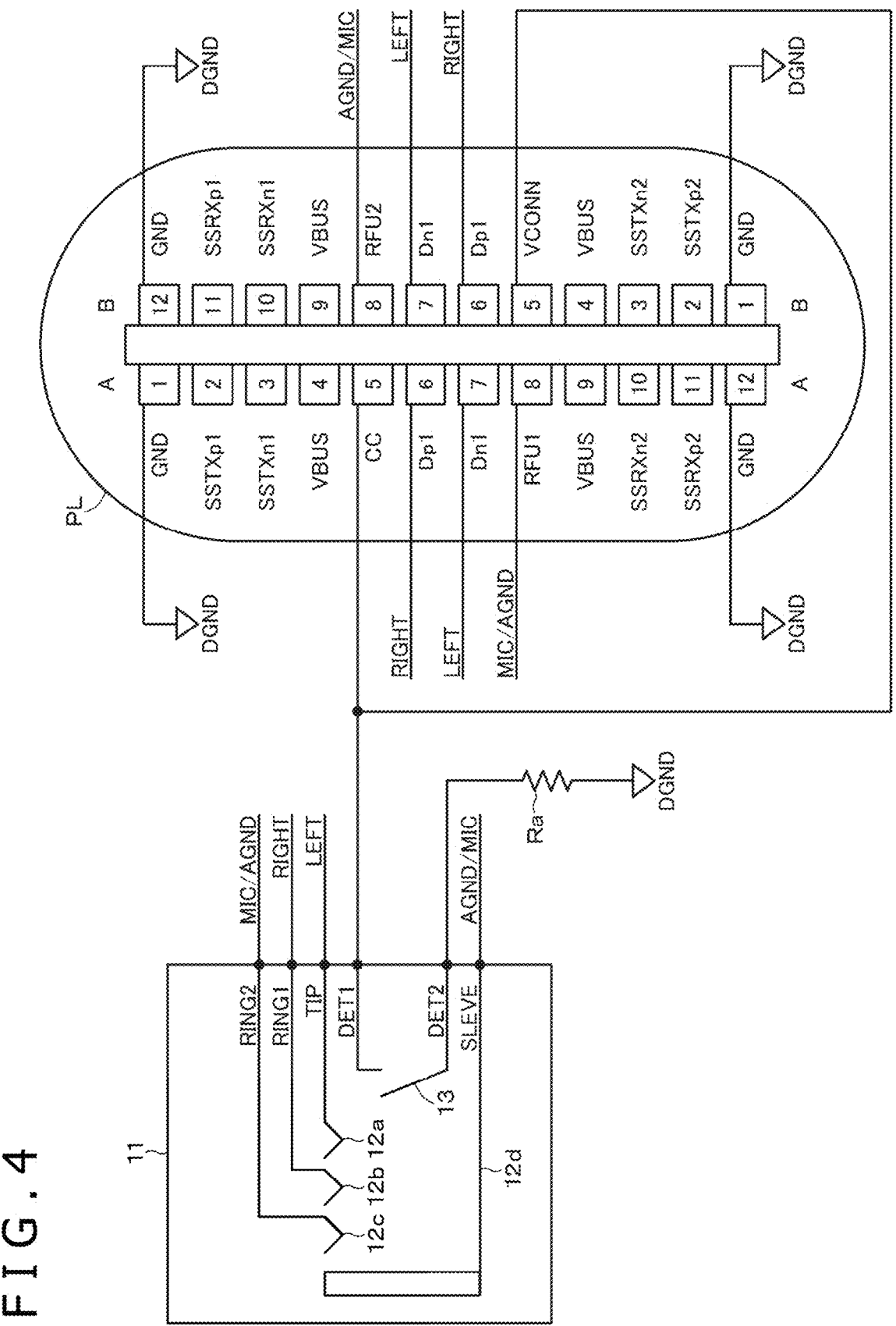
FIG. 4 is a connection diagram used to describe an audio adapter accessary mode.

As illustrated in FIG. 4, there is used a conversion cable which is connected at one end thereof with a jack 11 for the headset into which a round plug connected to the headset is inserted and is connected at the other end thereof with a USB Type-C plug PL. In the audio adapter accessary mode, four analog audio signals are transmitted through a conventional jack with a diameter of 3.5 mm. Specifically, the jack 11 has an electrode 12a connected to a tip (left channel terminal) of the plug inserted into the jack, an electrode 12b connected to a ring 1 (right channel terminal) of the plug, an electrode 12c connected to a ring (microphone terminal), and an electrode 12d connected to a sleeve (ground terminal) of the plug. Cables extended from the above electrodes are connected to predetermined pins of the plug PL.

In addition, the jack 11 has a detection switch 13. The detection switch 13 is a mechanical switch that turns on at the time when the round plug is inserted into the jack 11. When the detection switch 13 turns on, predetermined pins (A5: CC and B5: VCONN) of the plug PL are short-circuited via the detection switch 13 and are connected to a digital ground. That is, when a short circuit between CC and VCONN is confirmed, a mode moves to the audio adapter accessary mode.

In the audio adapter accessary mode, the pin assignment is specified as follows.

A5: CC: A system uses the pin A5 for detecting the audio adapter accessary mode.
B5: VCONN: The system uses the pin B5 for detecting the audio adapter accessary mode.

When the headset is connected, the pins A5 (CC) and B5 (VCONN) are connected to GND through a resistor with a certain impedance value Ra or less, and the connection of the headset is thereby detected. When the pins A5 (CC) and B5 (VCONN) are short-circuited, an impedance value between the terminal and the GND is less than Ra/2. Note that, as to this Ra, the impedance value is specified by the USB Type-C standard.

A6/B6: Dp (or D+): right: the ring 1 of the jack with a diameter of 3.5 mm: The pins A6 and B6 are connected to each other within the adapter.
A7/B7: Dn (or D−): left: the tip of the jack with a diameter of 3.5 mm: The pins A7 and B7 are connected to each other within the adapter.
A8: SBU1: microphone/audio ground: the ring 2 of the jack with a diameter of 3.5 mm
B8: SBU2: microphone/audio ground: the sleeve of the jack with a diameter of 3.5 mm
A1/A12, B1/B12: GND: Digital ground
A4/A9, B4/B9: VBUS: A current for charging a battery of the system is supplied.

The pins other than the above-described pins are non-connection.

In the audio adapter accessary mode, the pins (A2/A3, A10/A11, B2/B3, B10/B11, A4/A9, and B4/B9) other than the above-described assignment pins are not used. Further, as in the pins A6/B6, A7/B7, and the like, two pins are assigned to one signal. The reason is that, whether the plug is forward-connected or reverse-connected to the receptacle, an interference is prevented from occurring. However, to each of the microphone and the audio ground (or analog ground), only one pin is assigned in accordance with limitation of the number of pins. Accordingly, in the case of the forward connection, for example, the pin A8 and the pin B8 are assigned to the microphone and the audio ground, respectively. In the case of the reverse connection, for example, the pin A8 and the pin B8 are assigned to the audio ground and the microphone, respectively. As described above, the pin assignment is not fixed on the microphone and the audio ground, and therefore it is necessary to perform determination on the set side.

Figure 5:
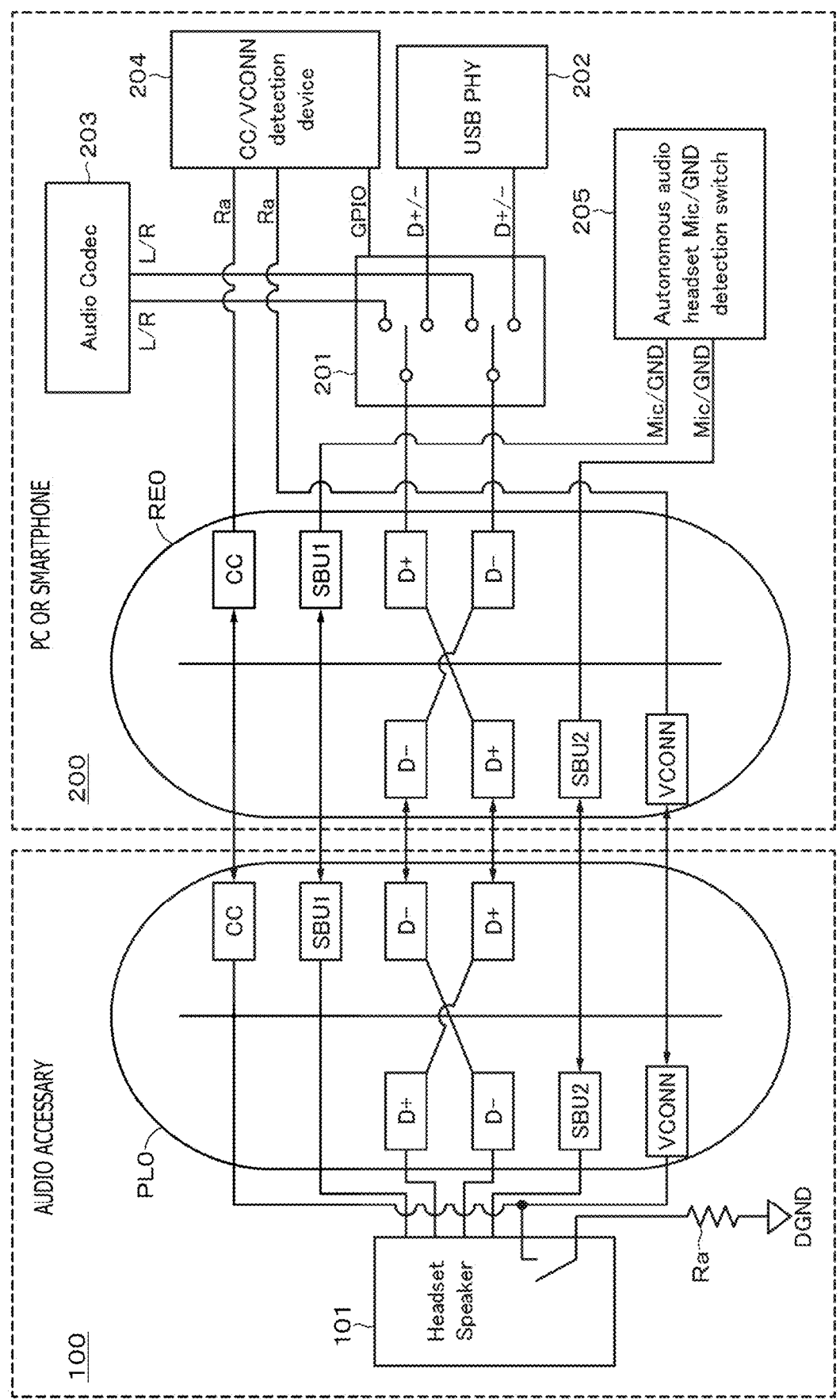
FIG. 5 is a block diagram used to describe the audio adapter accessary mode.

FIG. 5 illustrates an example of a configuration in which the analog audio signal is transmitted through the USB Type-C connection. An audio accessary 100 and a set (note PC or smartphone) 200 are connected to each other through a plug PL0 and a receptacle RE0. A headset speaker 101 is provided in the audio accessary 100 and analog audio signals supplied through the pins of D+ and D− are reproduced by using the headset speaker 101.

A switching circuit 201 is provided in the set side. The switching circuit 201 is controlled by an output GPIO of a detection device 204. The switching circuit 201 connects one of a USB interface 202 and an audio codec 203 to data pins D+ and D− of the receptacle RE0. Specifically, when the detection device 204 detects the audio adapter accessary mode, the audio codec 203 is selected. When the detection device 204 does not detect the audio adapter accessary mode, the USB interface 202 is selected. As described above, when the short circuit between CC and VCONN is detected, the detection device 204 determines that the mode is the audio adapter accessary mode.

In addition, a microphone and audio ground determination circuit 205 is provided. The microphone and audio ground determination circuit 205 is a detection circuit that specifies the microphone and audio ground regarding the pins A8 and B8. In accordance with the configuration illustrated in FIG. 5, first, the mode is detected by the detection device 204. Then, the switching circuit 201 is controlled depending on the detection results. Further, in the case of the audio adapter accessary mode, a pin for the microphone and audio ground is decided.

In the above-described audio adapter accessary mode, the present technology is aimed at enabling the RF signal to be supplied to the set (receiving apparatus) while conforming to the USB Type-C standard.

In the first embodiment of the present technology, two ground pins that are positioned in a diagonal line direction are used from among four ground pins to receive the RF signal in the receptacle of the receiver. That is, the RF signal is supplied via the pins A1 and B1 or the pins A12 and B12. By adopting the above-described method, whether the plug is in the forward connection or the reverse connection, and even if the RF signal is input to the plug from one pin, the RF signal can be definitely input.

Here, a connection relation between four ground pins is described as follows.

At the time of the forward connection, the pin A1 on the receptacle side and the pin A1 on the plug side, the pin B1 on the receptacle side and the pin B1 on the plug side, the pin A12 on the receptacle side and the pin A12 on the plug side, and the pin B12 on the receptacle side and the pin B12 on the plug side are connected to each other.

At the time of the reverse connection, the pin A1 on the receptacle side and the pin B1 on the plug side, the pin B1 on the receptacle side and the pin A1 on the plug side, the pin A12 on the receptacle side and the pin B12 on the plug side, and the pin B12 on the receptacle side and the pin A12 on the plug side are connected to each other.

Configuration Example of the Conversion Cable According to the First Embodiment

Figure 6:
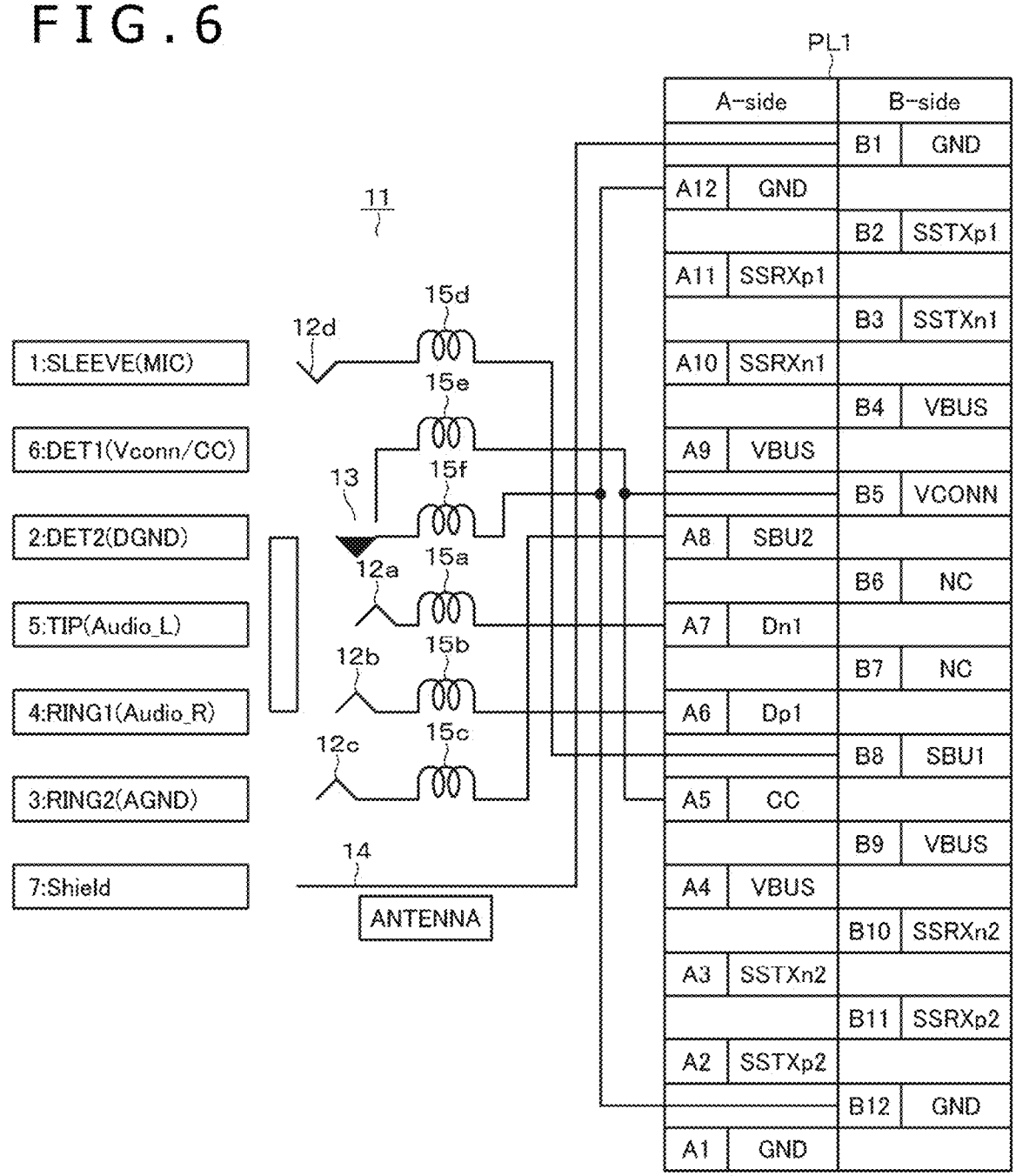
FIG. 6 is a connection diagram used to describe a conversion cable according to a first embodiment.

FIG. 6 illustrates a configuration of the conversion cable according to the first embodiment. Similarly to FIG. 4, the jack 11 to which the headset is connected and the plug PL1 are connected to each other through the cable. The headset has a configuration in which earphones are connected to a round 4-pole plug inserted into the jack 11 through the earphone cable. In addition, an earphone cable in a ground line common to left and right channels is provided. The jack 11 has the detection switch 13 that turns on when the plug is inserted into the jack 11.

A left-channel signal line is drawn out from the electrode 12a of the jack 11 via an inductance device 15a and is connected to at least one of the pins A7 and B7 of the plug PL1. A right-channel signal line is drawn out from the electrode 12b of the jack 11 via an inductance device 15b and is connected to at least one of the pins A6 and B6 of the plug PL1. An audio ground line is drawn out from the electrode 12c of the jack 11 via an inductance device 15c and is connected to the pin A8 of the plug PL1. A microphone line is drawn out from the electrode 12d of the jack 11 via an inductance device 15d and is connected to the pin B8 of the plug PL1.

A line drawn out from one contact point of the detection switch 13 is connected to the pins A5 (CC) and B5 (VCONN) of the plug PL1 via an inductance device 15e. A line drawn out from the other contact point of the detection switch 13 is connected to the pins A12 (GND) and B12 (GND) via the inductance device 15e. When an audio plug of the headset is inserted into the jack 11, the detection switch 13 turns on and the pins A5 (CC) and B5 (VCONN) are short-circuited, and the audio adapter accessary mode is thereby recognized. Note that the inductance devices 15a to 15f are high-frequency cutoff devices such as inductors and ferrite beads with which impedance becomes high and coupling in a line is prevented at a desired band (e.g., a band of digital television broadcasting).

Further, the cable that connects the jack 11 and the USB Type-C plug PL1 has a shield line 14 made of a braided copper wire in addition to the six lines described above. The shield line 14 of the cable functions as a monopole antenna. For example, a length of the cable is set to approximately $\lambda/4$ ($\lambda$: wavelength of a reception frequency). The shield line 14 is connected to the pin B1 of the plug PL1. Accordingly, the antenna signal is supplied to the pin B1 of the plug PL1. The pins A1 and B1 are pins that are positioned in the diagonal line direction of the pin array.

The configuration in which the jack 11 and plug PL1 described above according to the first embodiment are connected through a cable with a predetermined length acts as a cable with an antenna. For example, sound of a program being viewed can be heard by using the headset while receiving the television broadcasting by using a receiver of the mobile terminal, etc. Accordingly, the function of the USB Type-C interface of the receiver can be expanded to transmission of the analog audio signal and that of the antenna signal in addition to the high-speed data transmission.

Configuration Example on the Receiver Side According to the First Embodiment

Figure 7:
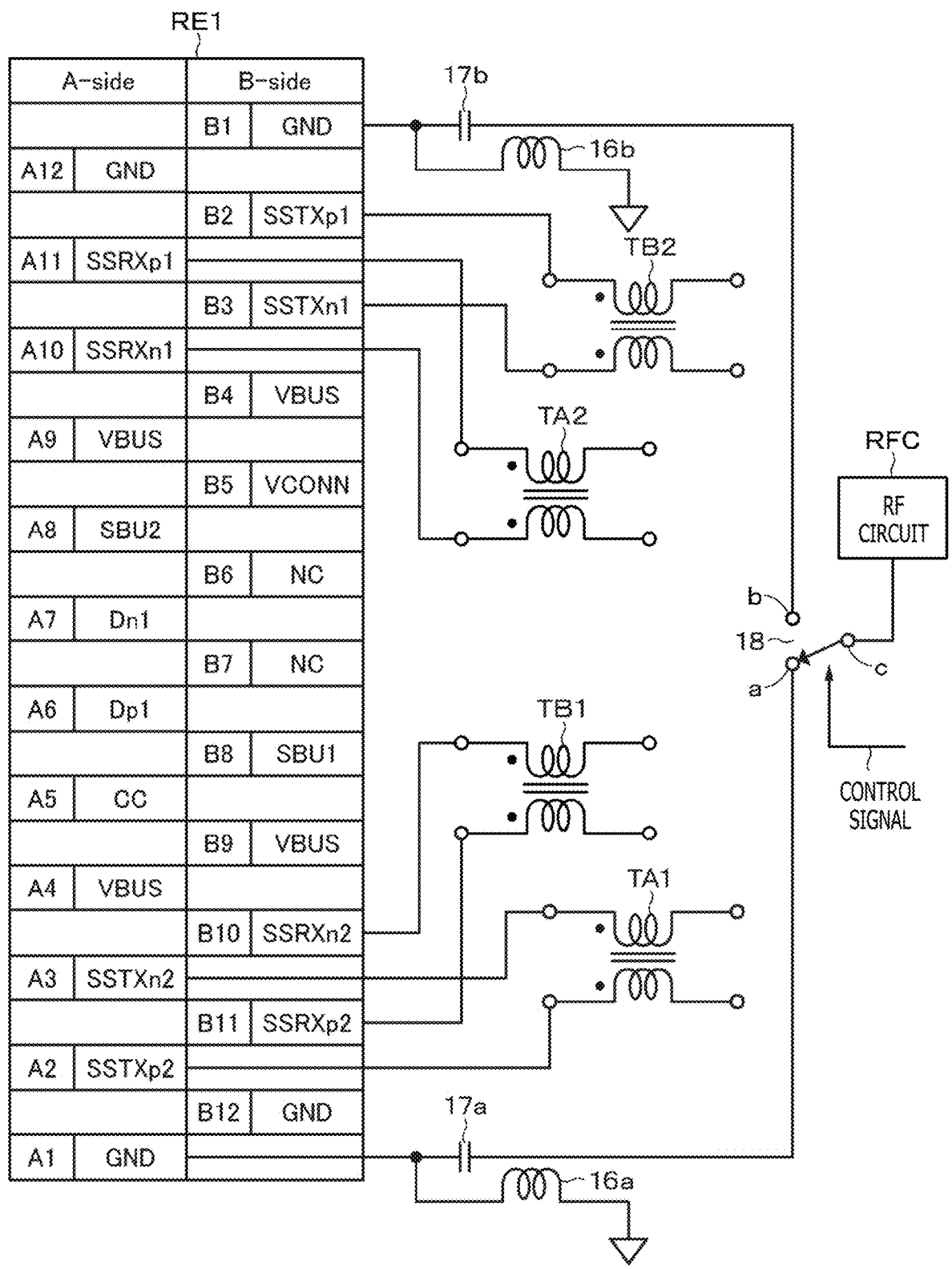
FIG. 7 is a connection diagram used to describe a configuration on a receiver side according to the first embodiment.

FIG. 7 illustrates a configuration relating to a receptacle RE1 on the receiver side. In the first embodiment of the present technology, the RF signal is transmitted via the pins A1 (GND) and B1 (GND) that exist at diagonal positions when viewing the receptacle (or the plug) from the front face. As described above, the antenna signal functioning as the RF signal is supplied to the pin B1 of the plug PL1. In the case where the plug PL1 is forward-connected to the receptacle RE1, the antenna signal is supplied to the pin B1 of the receptacle RE1. In the case where the plug PL1 is reverse-connected to the receptacle RE1, the antenna signal is supplied to the pin A1 of the receptacle RE1. That is, whether the surface or the rear surface is set on the upper side, the plug PL1 can be inserted into the receptacle RE1 and therefore the antenna signal is input to the receiver from one of the pins A1 and B1 of the receptacle RE1.

The pin A1 of the receptacle RE1 is connected to a terminal a of a switch 18 via a capacitor 17a. The pin B1 of the receptacle RE1 is connected to a terminal b of the switch 18 via a capacitor 17b. An output terminal c of the switch 18 is connected to an input terminal of an RF circuit RFC such as a tuner and an amplifier. The capacitors 17a and 17b are capacitors for allowing necessary frequencies to pass through and are wired as a high-frequency transmission line of 50Ω on the input side of the receiver.

The pin A1 of the receptacle RE1 is grounded via an inductance device 16a and the pin B1 is grounded via an inductance device 16b. The inductance devices 16a and 16b are high-frequency cutoff devices such as inductors and ferrite beads with which the impedance becomes high at a desired band (e.g., band of the digital television broadcasting). Other than the audio adapter accessary mode, the impedance of the inductance devices 16a and 16b is low, and therefore the inductance devices 16a and 16b function as the ground.

The switch 18 is switched by using a control signal. As an example, the presence or absence of the antenna signal is detected from the output signal of the switch 18. In the case where a signal from the output terminal c of the switch 18 is the antenna signal, a connection state of the switch 18 is kept as it is. In the case where the antenna signal cannot be detected in the output terminal c of the switch 18, the connection state of the switch 18 is switched from the current state. The control signal may be formed by using another method. For example, the control signal may be formed in accordance with a detection of the forward connection or reverse connection of the plug PL1.

Further, as a method for switching the switch 18, switching can be performed by manual operation. For example, in the case where the antenna signal cannot be detected in the output of the switch 18, a pop-up screen indicating that it is impossible to detect the antenna signal is displayed on a screen of a display apparatus to thereby urge a viewer to switch the switch 18.

Meanwhile, in order to secure isolation from an antenna input, common mode chalk coils TA1 and TA2 are connected to the pins A2 and A3 and the pins A10 and A11, respectively, for high-speed differential transmission approximate to the antenna input terminal (pins A1 and B1). Similarly, common mode chalk coils TB1 and TB2 are connected to the pins B10 and B11 and the pins B2 and B3, respectively, for the high-speed differential transmission.

According to the above-described configuration (receptacle RE1) on the receiver side, no matter what directions the plug PL1 connected to a cable having a function of the antenna cable is connected in, the antenna signal can be received, the television broadcasting can be received, and sound can be heard by using the headset.

Configuration Example of the Cable According to the First Embodiment

Figure 8:
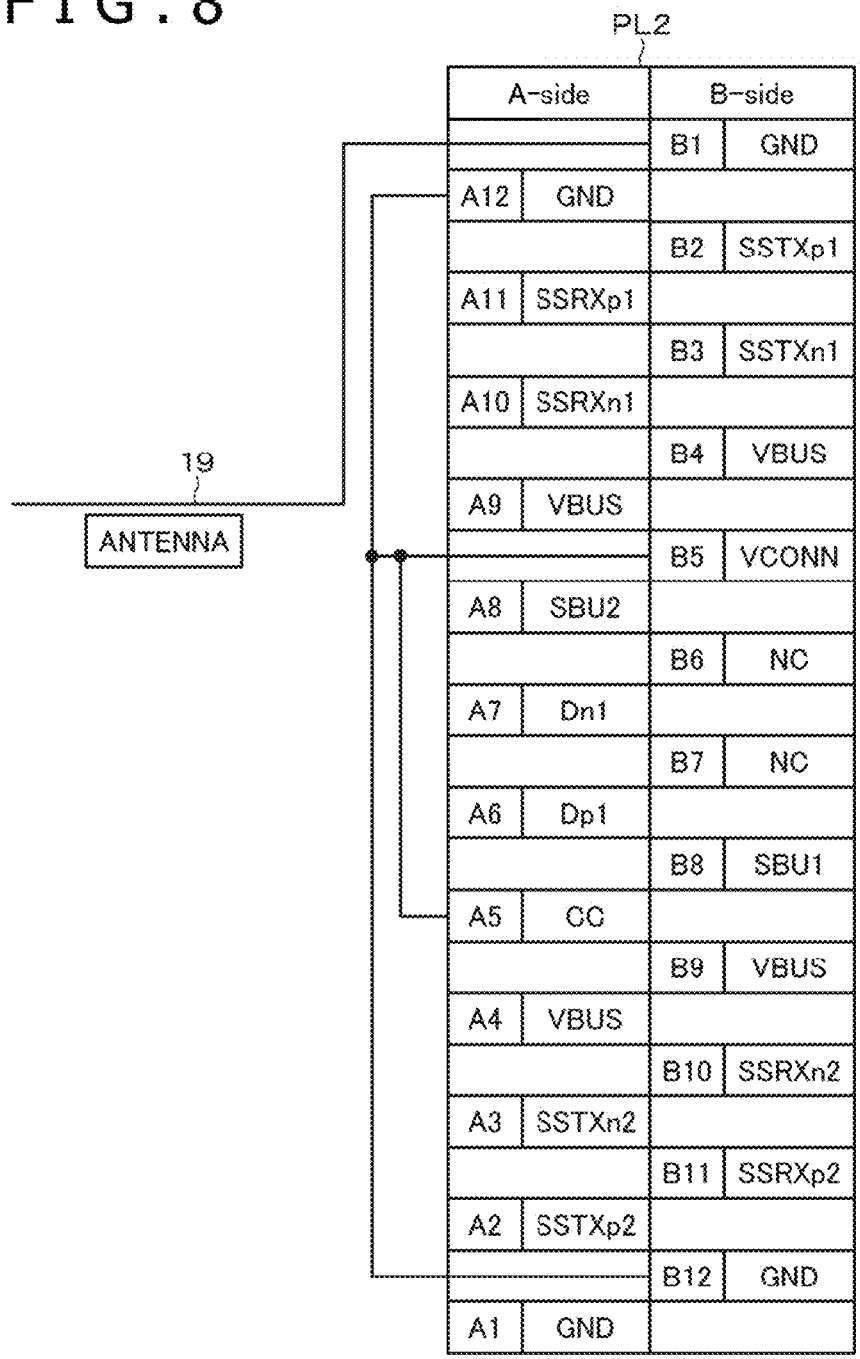
FIG. 8 is a connection diagram used to describe a cable according to the first embodiment.

FIG. 8 illustrates a configuration example (plug PL2) of the cable according to the first embodiment. The above-described conversion cable has a configuration in which the jack 11 and the plug PL1 are connected to each other via the cable. On the other hand, the plug PL2 is configured such that no jack 11 (detection switch 13) is provided. The pins A5 (CC) and B5 (VCONN) of the plug PL2 are mutually connected to the pins A12 (GND) and B12 (GND) of the plug PL2 in order to recognize the audio adapter accessary mode.

Although not illustrated here, a substrate is connected to the plug PL2 and an antenna signal input line 19 is formed on the substrate. Although not illustrated here, an antenna device of approximately $\lambda/4$ ($\lambda$: wavelength of the reception frequency) of frequency desired to be directly received is connected to the antenna input line 19 to constitute the monopole antenna. Note, however, that a length of the antenna device is varied depending on the connected equipment and therefore the antenna device does not necessarily need to have this length. Further, the antenna signal may be directly input to the plug PL2 through a coaxial cable. Specifically, a core wire of the coaxial cable is connected to the antenna signal input line 19 and the antenna signal input line 19 is connected to the pin B1 of the plug PL2. Although not illustrated, a shield line of the coaxial cable is connected to GND pins, here, the pins A12 and B12, other than the pins B1 and A1 that are positioned in the diagonal line direction to constitute an RF line of 50Ω, etc. Further, the RF connector, for example, an F connector can be connected to an end opposite to the plug PL2 of the coaxial cable and further can be connected to a television antenna mounted on the outside of housing. Such a plug PL2 is also connected to the receptacle RE1 that is described with reference to FIG. 7 and the antenna signal is transmitted.

2. Second Embodiment

Configuration Example of a Conversion Cable According to a Second Embodiment

Figure 9:
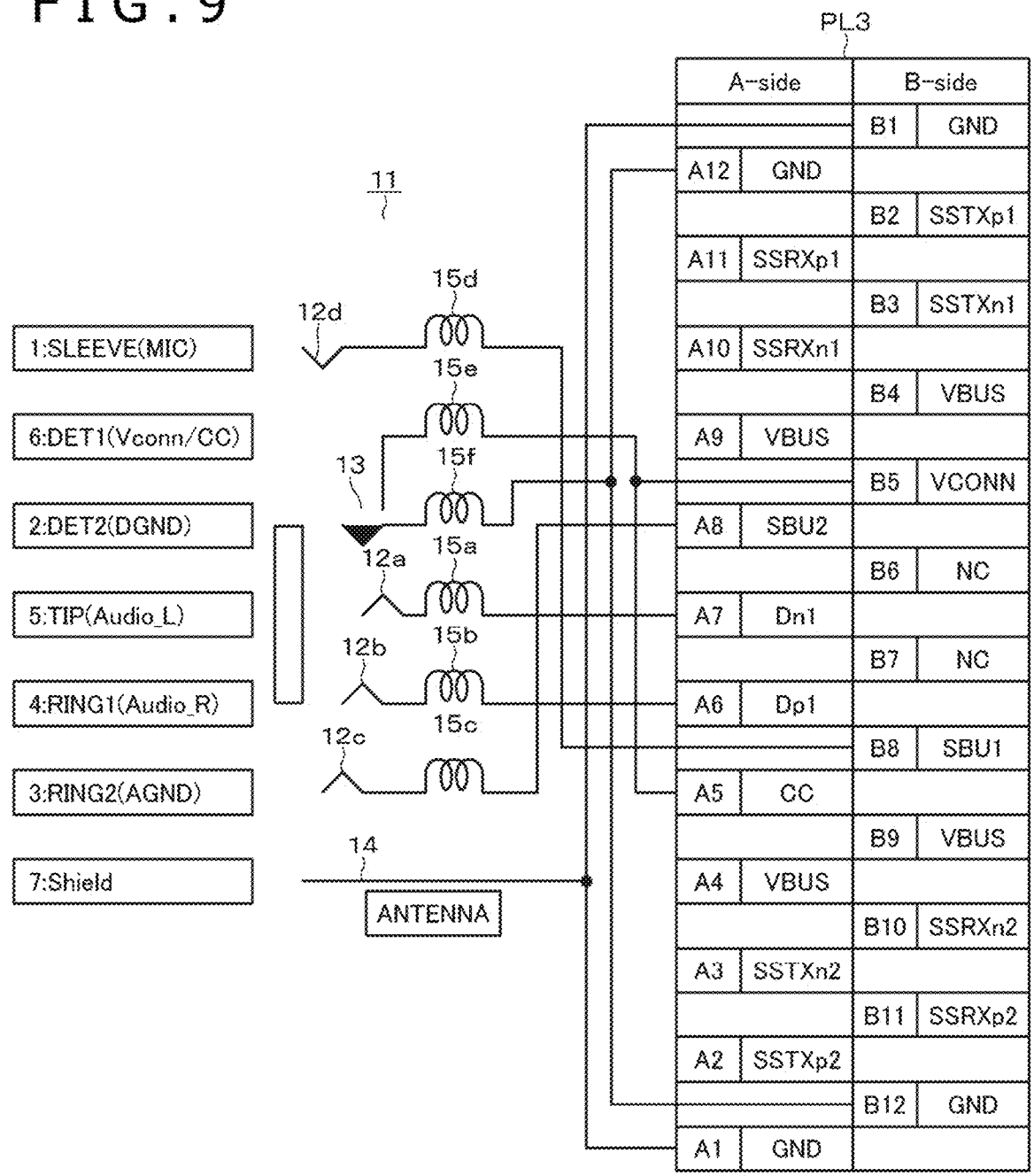
FIG. 9 is a connection diagram used to describe a conversion cable according to a second embodiment.

FIG. 9 illustrates a configuration of a conversion cable according to a second embodiment. The jack 11 to which a headset is connected and a plug PL3 are connected to each other through a cable similarly to the conversion cable of the first embodiment illustrated in FIG. 6. The headset has a configuration in which earphones are connected to a round 4-pole plug inserted into the jack 11 through an earphone cable. In addition, the earphone cable in a ground line common to left and right channels is provided. The jack 11 has the detection switch 13 that turns on when the plug is inserted into the jack 11.

A left-channel signal line is drawn out from the electrode 12a of the jack 11 via the inductance device 15a and is connected to at least one of the pins A7 and B7 of the plug PL3. A right-channel signal line is drawn out from the electrode 12b of the jack 11 via the inductance device 15b and is connected to at least one of the pins A6 and B6 of the plug PL3. An audio ground line is drawn out from the electrode 12c of the jack 11 via the inductance device 15c and is connected to the pin A8 of the plug PL3. A microphone line is drawn out from the electrode 12d of the jack 11 via the inductance device 15d and is connected to the pin B8 of the plug PL3.

A line drawn out from one contact point of the detection switch 13 is connected to the pins A5 (CC) and B5 (VCONN) of the plug PL3 via the inductance device 15e. A line drawn out from the other contact point of the detection switch 13 is connected to the pins A12 (GND) and B12 (GND) via the inductance device 15e. When the audio plug of the headset is inserted into the jack 11, the detection switch 13 turns on, the pins A5 (CC) and B5 (VCONN) are short-circuited, and the audio adapter accessary mode is recognized. Note that the inductance devices 15a to 15f are high-frequency cutoff devices such as inductors and ferrite beads with which impedance becomes high and coupling in a line is prevented at a desired band (e.g., band of digital television broadcasting).

Further, the cable that connects the jack 11 and the USB Type-C plug PL3 has the shield line 14 made of a braided copper wire in addition to the six lines described above. The shield line 14 of the cable functions as a monopole antenna. For example, a length of the cable is set to approximately λ/4 (λ: wavelength of a reception frequency). The shield line 14 is connected to the pins A1 and B1 of the plug PL3. The pins A1 and B1 are pins that are positioned in the diagonal line direction of the pin array. Accordingly, an antenna signal is supplied to the pins A1 and B1 of the plug PL3. Further, a length of a signal path of branched portions by the pins A1 and B1 is made equal so that lengths of RF signals are made equal.

The configuration in which the jack 11 and the plug PL3 described above according to the second embodiment are connected to each other through a cable with a predetermined length acts as the conversion cable. For example, sound of a program being viewed can be heard by using the headset while receiving television broadcasting by using a receiver of a mobile terminal, etc. Accordingly, the function of the USB Type-C interface of the receiver can be expanded to transmission of the analog audio signal and that of the antenna signal other than high-speed data transmission. A different point from the conversion cable according to the first embodiment is that the antenna signal is supplied to both of the pins A1 and B1.

Figure 10:
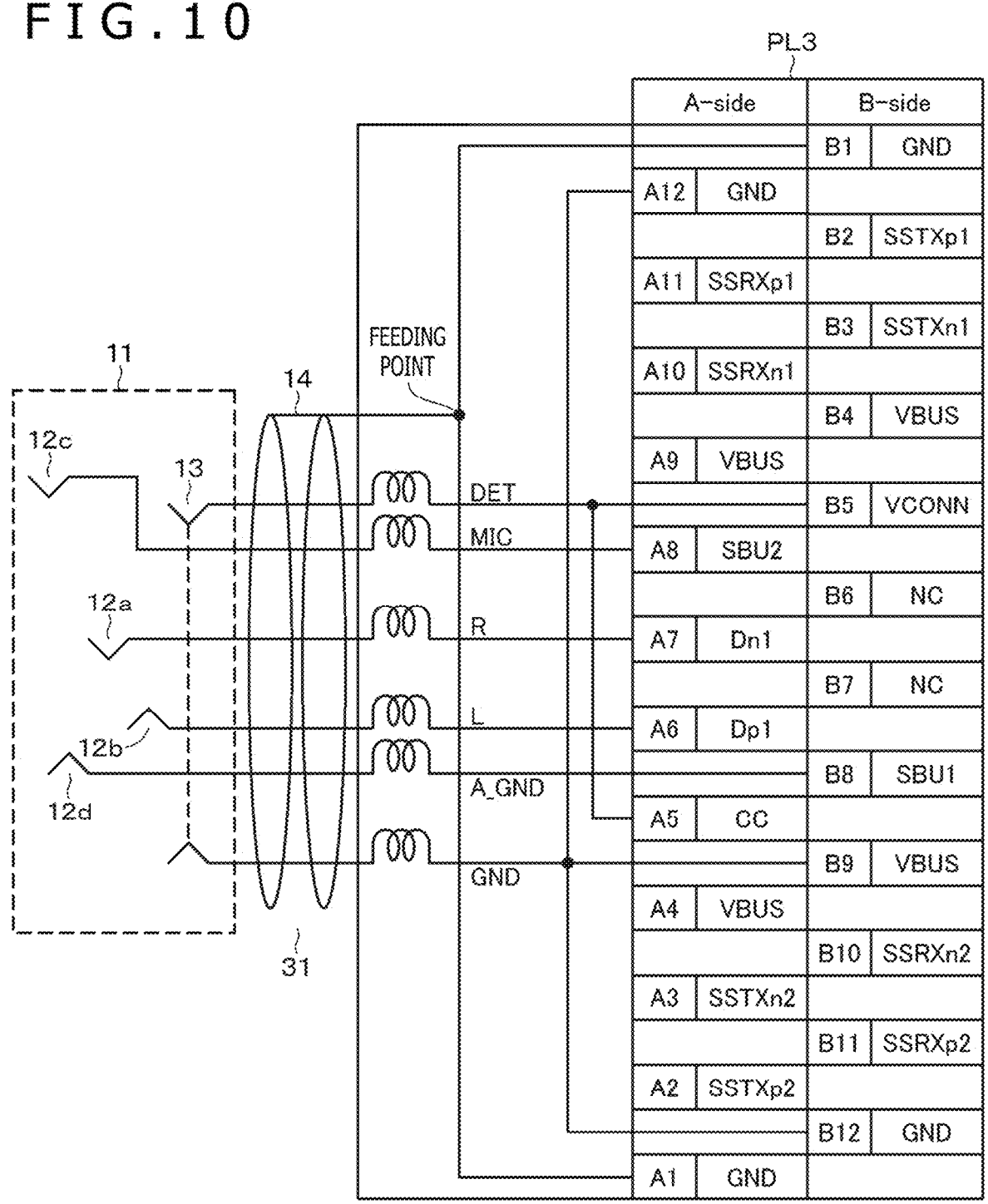
FIG. 10 is a connection diagram used to describe the conversion cable according to the second embodiment.

FIG. 10 illustrates a configuration similar to that of FIG. 9. In FIG. 10, a coaxial cable 31 between the jack (e.g., a 6-pole jack) and the plug PL3 is illustrated. A point at which the shield line 14 of the coaxial cable 31 is connected to the pins A1 and B1 of the plug PL3 is a feeding point. The feeding point and the pins A1 and B1 are connected to each other through a high-frequency line of 50Ω.

Configuration Example on the Receiver Side According to the Second Embodiment

Figure 11:
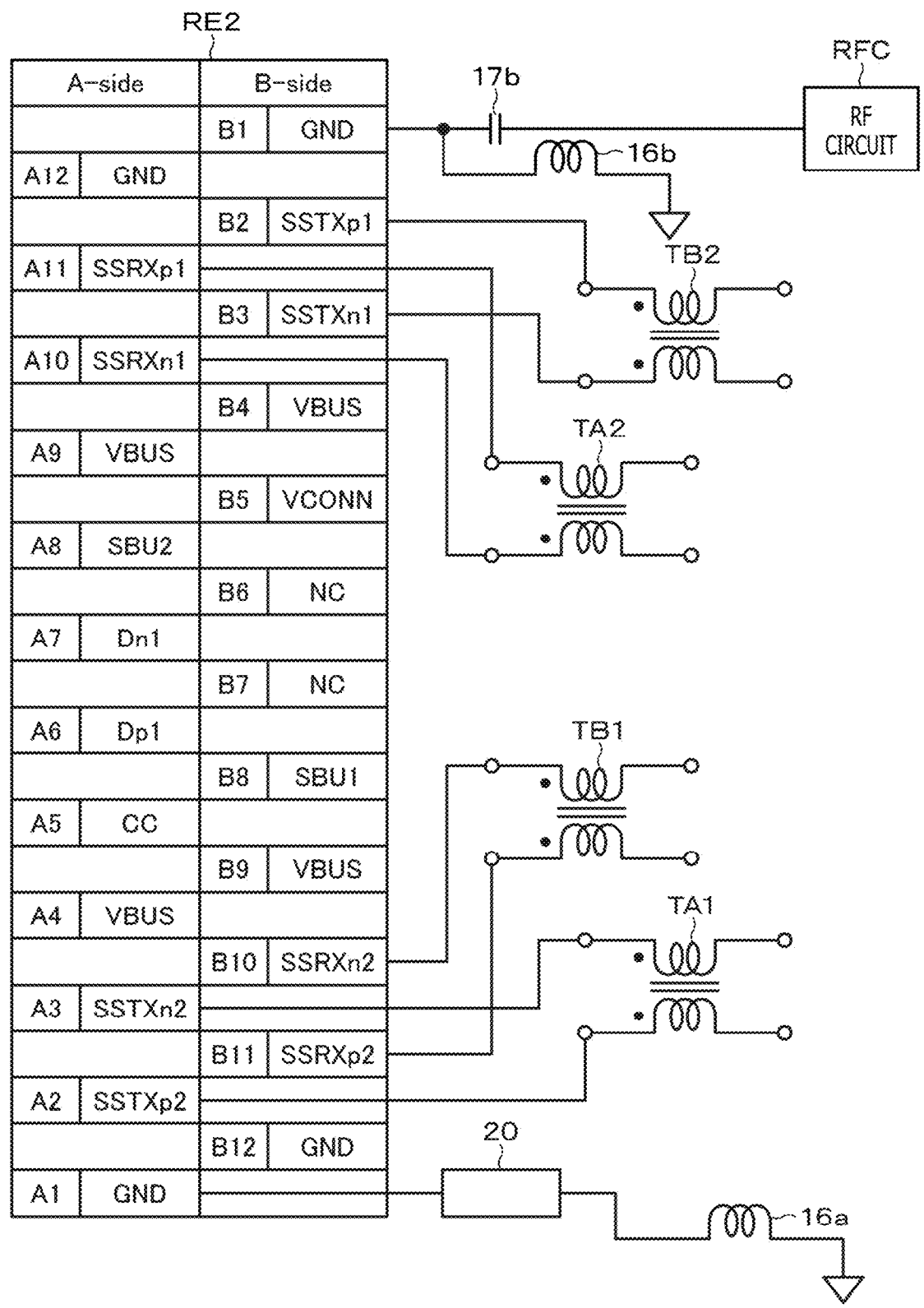
FIG. 11 is a connection diagram used to describe a configuration on a receiver side according to the second embodiment.

FIG. 11 illustrates a configuration relating to a receptacle RE2 on the receiver side. In the second embodiment of the present technology, the RF signal is supplied to both of the pins A1 (GND) and B1 (GND) that exist at the diagonal positions when viewing the receptacle (or the plug) from the front face. As described above, the antenna signal functioning as the RF signal is supplied to the pins A1 and B1 of the plug PL3. Whether the plug PL3 is forward- or reverse-connected to the receptacle RE2, the RE signal is supplied to the pins A1 and B1 of the receptacle RE2. That is, whether the surface or the rear surface is set on the upper side, the plug PL3 can be inserted into the receptacle RE2 and therefore the antenna signal is input to the receiver from both of the pins A1 and B1 of the receptacle RE2. The second embodiment described above is different from the first embodiment in that it is not necessary to install a switch for switching the RF signal on the receiver side.

The pin B1 of the receptacle RE2 is connected to an input terminal of an RF circuit RFC such as a tuner and an amplifier within the receiver via the capacitor 17b. Since the RF circuit normally has one input terminal, the pin A1 of the receptacle RE2 to which the antenna side is connected is not connected to the input terminal of the RF circuit. There is the possibility that a physical length of a wiring regarding the pin A1 functions as a stub of the signal line (line via the pin B1) and a necessary frequency band is rejected. To solve the above problem, a stub 20 is connected to the pin A1 of the receptacle RE2 in order to make adjustments so as to prevent a stub at the desired band. An electric length (stub length) of the stub 20 is set to thereby exclude an influence at the desired frequency band.

The pin A1 of the receptacle RE2 is grounded via the inductance device 16a and the pin B1 is grounded via the inductance device 16b. The inductance devices 16a and 16b are high-frequency cutoff devices such as inductors and ferrite beads with which the impedance becomes high at the desired band (e.g., band of the digital television broadcasting). Other than the audio adapter accessary mode, the impedance of the inductance devices 16a and 16b is low, and therefore the inductance devices 16a and 16b function as the ground.

Meanwhile, in order to secure the isolation from an antenna input, the common mode chalk coils TA1 and TA2 are connected to the pins A2 and A3 and the pins A10 and A11, respectively, for the high-speed differential transmission approximate to the antenna input terminals (pins A1 and B1). Similarly, the common mode chalk coils TB1 and TB2 are connected to the pins B10 and B11 and the pins B2 and B3, respectively, for the high-speed differential transmission.

According to the above-described configuration (receptacle RE2) on the receiver side, no matter what directions the plug PL3 connected to a cable having the function of the antenna cable is connected in, the antenna signal can be received, the television broadcasting can be received, and sound can be heard by using the headset. Further, it is not necessary to select the RF signal by a switch as in the first embodiment.

Figure 12:
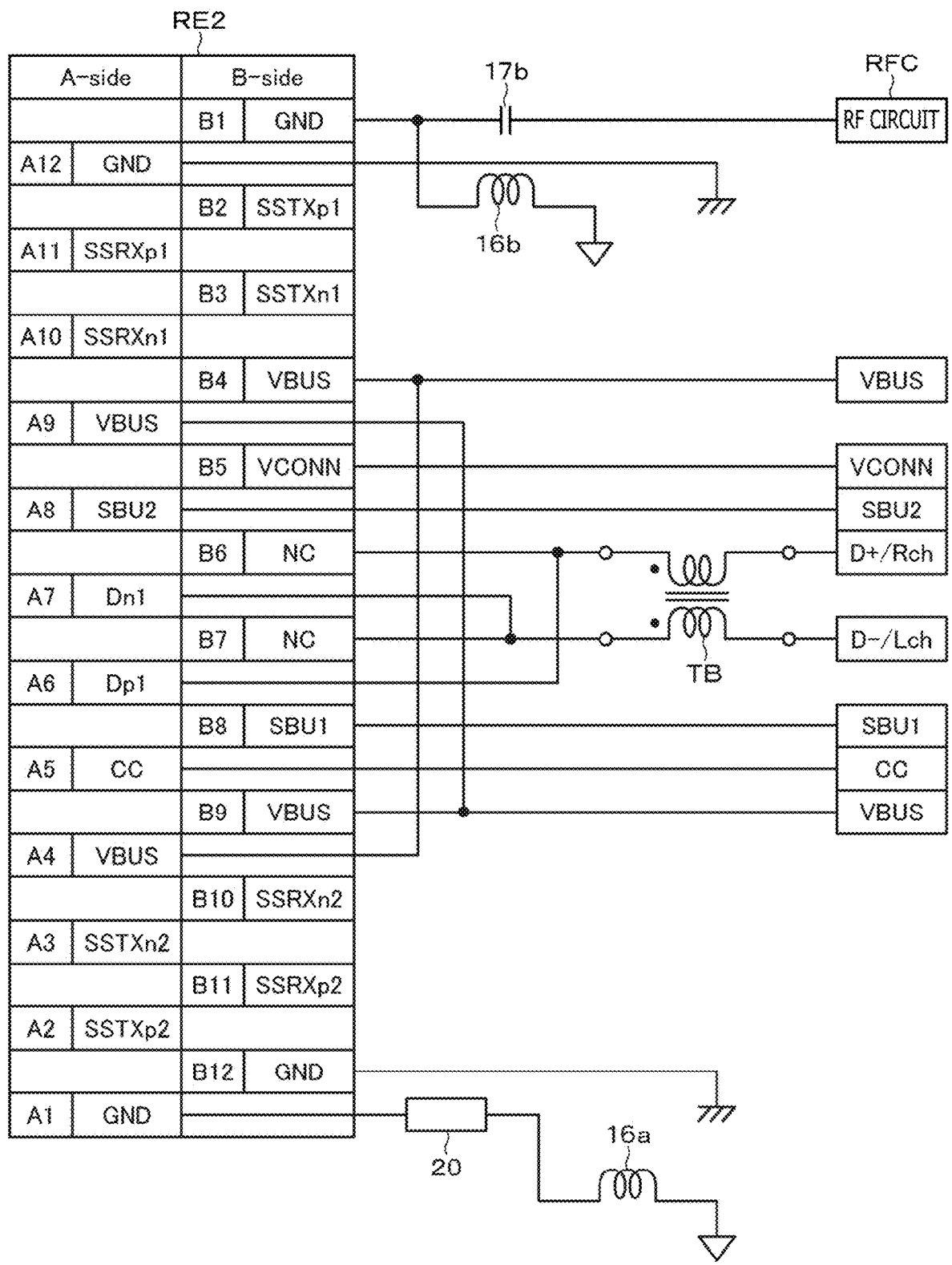
FIG. 12 is a connection diagram used to describe the configuration on the receiver side according to the second embodiment.

FIG. 12 illustrates a configuration similar to that of FIG. 11. In FIG. 12, a pin assignment (pins for use in the audio adapter accessary mode excluding VBUS) of the pins omitted in FIG. 11 is illustrated.

Antenna Gain According to the Second Embodiment

Figure 13A:
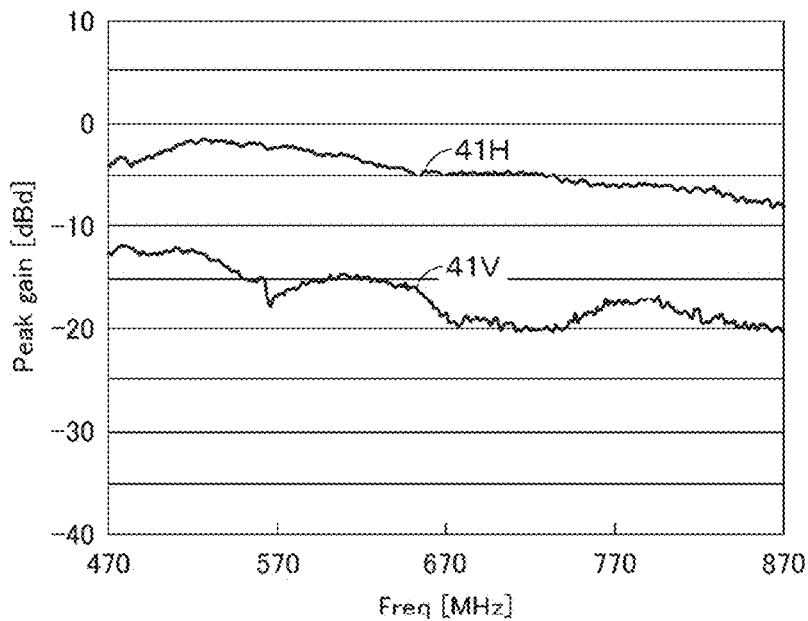
FIG. 13A is a graph indicating frequency characteristics of a gain in a television band obtained by a simulation in the case of forward connection.
Figure 13B:
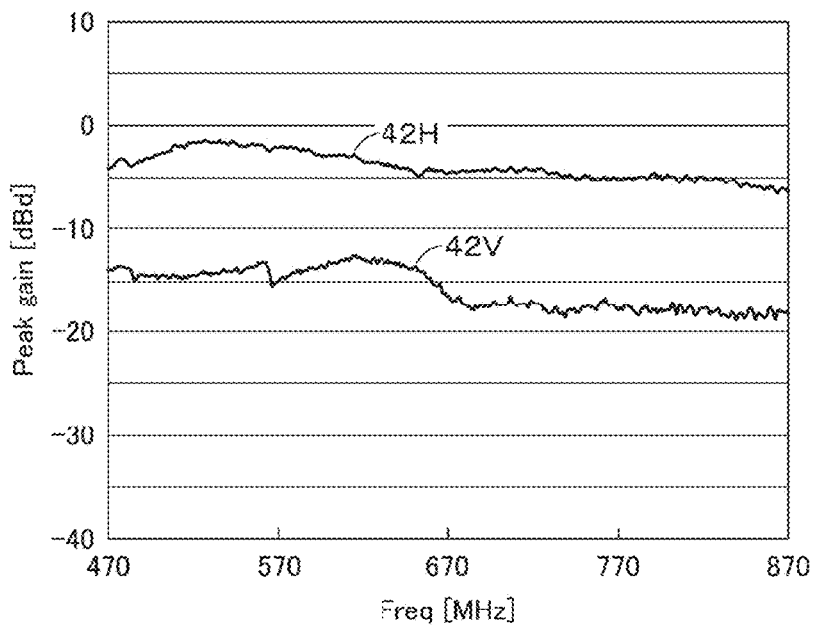
FIG. 13B is a graph indicating frequency characteristics of a gain in a television band obtained by a simulation in the case of reverse connection.

A peak antenna gain of the second embodiment described above is obtained by a simulation and the results are illustrated in FIGS. 13A and 13B. FIG. 13A illustrates the peak antenna gain in the case in which the plug is forward-connected to the receptacle. FIG. 13B illustrates the peak antenna gain in the case in which the plug is reverse-connected to the receptacle. A horizontal axis represents a frequency band: a UHF (Ultra High Frequency) band (470 to 800 MHz) at which terrestrial digital television broadcasting is performed. A vertical axis represents a peak gain (dBd). dBd is a value obtained by comparing with a dipole antenna. A relation of (dBd=2.15 dBi) holds. dBi represents an antenna gain (absolute gain).

In FIGS. 13A and 13B, graphs represented by signs 41H and 42H indicate frequency-gain characteristics at the time of receiving horizontally-polarized waves. Graphs represented by signs 41V and 42V indicate frequency-gain characteristics at the time of receiving vertically-polarized waves. Tables 1 and 2 indicate data in the graphs 41H and 41V and tables 3 and 4 indicate data in the graphs 42H and 42V. As can be seen in FIGS. 13A and 13B, the antenna according to the second embodiment of the present technology has no performance difference between the forward connection and the reverse connection and can receive television broadcast radio waves.

TABLE 1

| | Vertical polarization | | | | | | | |
|---|---|---|---|---|---|---|---|---|
| Freq [mHz] | 470 | 520 | 570 | 620 | 670 | 720 | 770 | 906 |
| Peak [dBd] | −12.62 | −12.37 | −16.62 | −14.93 | −18.58 | −20.20 | −17.70 | −20.00 |

TABLE 2

| | Horizontal polarization | | | | | | | |
|---|---|---|---|---|---|---|---|---|
| Freq [mHz] | 470 | 520 | 570 | 620 | 670 | 720 | 770 | 906 |
| Peak [dBd] | −4.09 | −1.77 | −2.31 | −3.73 | −4.98 | −4.83 | −6.10 | −9.15 |

TABLE 3

| | Vertical polarization | | | | | | | |
|---|---|---|---|---|---|---|---|---|
| Freq [mHz] | 470 | 520 | 570 | 620 | 670 | 720 | 770 | 906 |
| Peak [dBd] | −13.96 | −14.46 | −14.82 | −12.99 | −16.43 | −17.05 | −17.90 | −17.44 |

TABLE 4

| | Horizontal polarization | | | | | | | |
|---|---|---|---|---|---|---|---|---|
| Freq [mHz] | 470 | 520 | 570 | 620 | 670 | 720 | 770 | 906 |
| Peak [dBd] | −4.09 | −1.66 | −2.11 | −3.53 | −4.58 | −4.25 | −5.30 | −6.84 |

Configuration Example of the Cable According to the Second Embodiment

Figure 14:
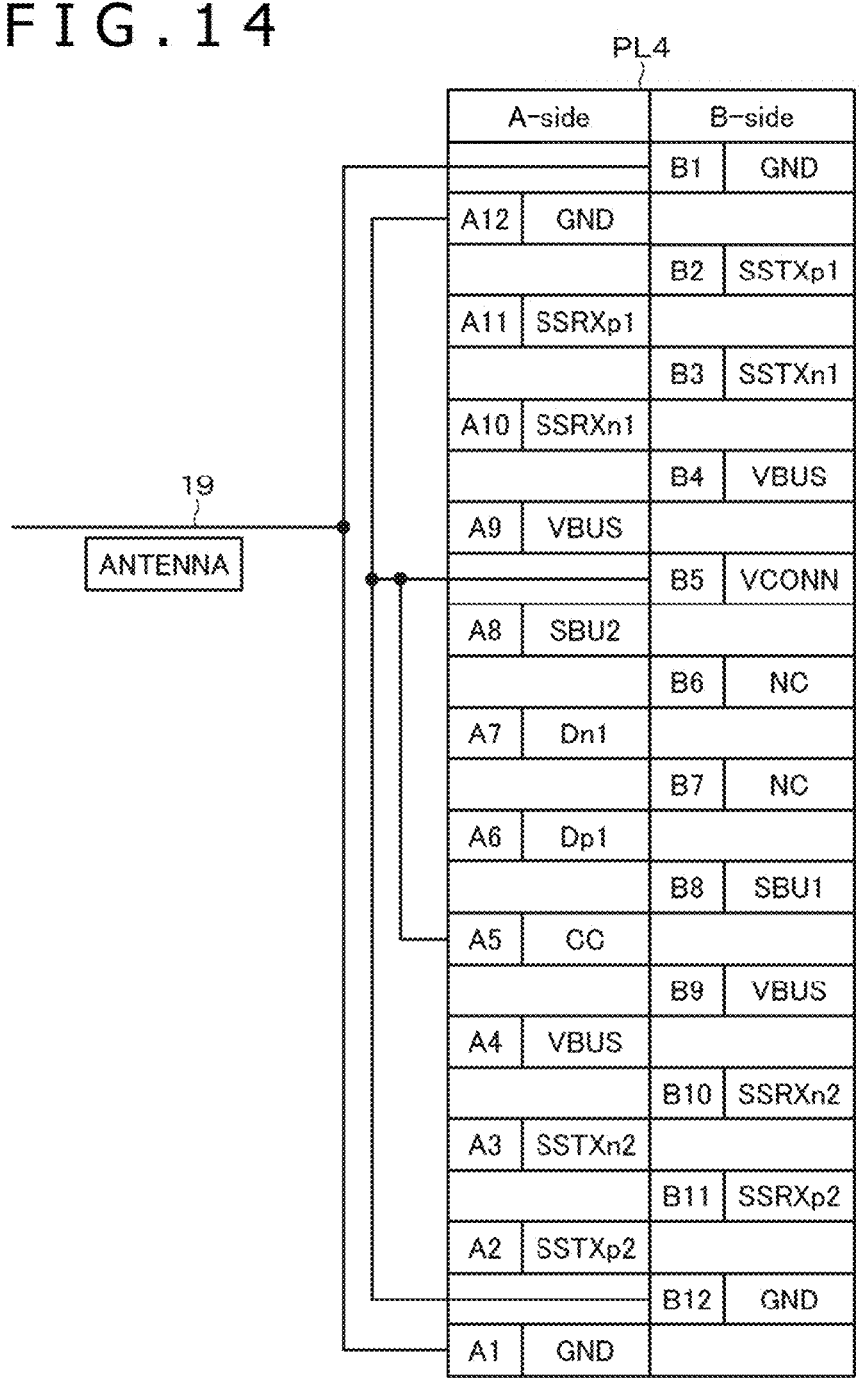
FIG. 14 is a connection diagram used to describe a cable according to the second embodiment.

FIG. 14 illustrates another example (plug PL4) of the configuration of the cable according to the second embodiment. The conversion cable described above has a configuration in which the jack 11 and the plug PL3 are connected to each other through the cable. On the other hand, the plug PL4 is configured such that no jack 11 (detection switch 13) is provided. The pins A5 (CC) and B5 (VCONN) of the plug PL4 are mutually connected to the pins A12 (GND) and B12 (GND) of the plug PL4 in order to recognize the audio adapter accessary mode.

Although not illustrated here, a substrate is connected to the plug PL4 and the antenna signal input line 19 is formed on the substrate. In the substrate, the antenna signal input line 19 is connected to both of the pins A1 and B1 of the plug PL4. Although not illustrated here, an antenna device of approximately λ/4 (λ: wavelength of the reception frequency) of a frequency desired to be directly received is connected to the antenna input line 19 to constitute the monopole antenna. Note, however, that a length of the antenna device is varied depending on the connected equipment and therefore the antenna device does not necessarily need to have this length. Further, the antenna signal may be directly input to the plug PL4 through a coaxial cable. Specifically, the core wire of the coaxial cable is connected to the antenna signal input line 19 and the antenna signal input line 19 is connected to both of the pins A1 and B1 of the plug PL4. Although not illustrated here, the shield line of the coaxial cable is connected to the GND pins, here, the pins A12 and B12, other than the pins B1 and A1 that are positioned in the diagonal line direction to constitute the RF line of 50Ω, etc. The plug PL4 described above is also connected to the receptacle RE1 that is described with reference to FIG. 7 or the receptacle RE2 that is described with reference to FIG. 11, and the antenna signal is transmitted.

Figure 15:
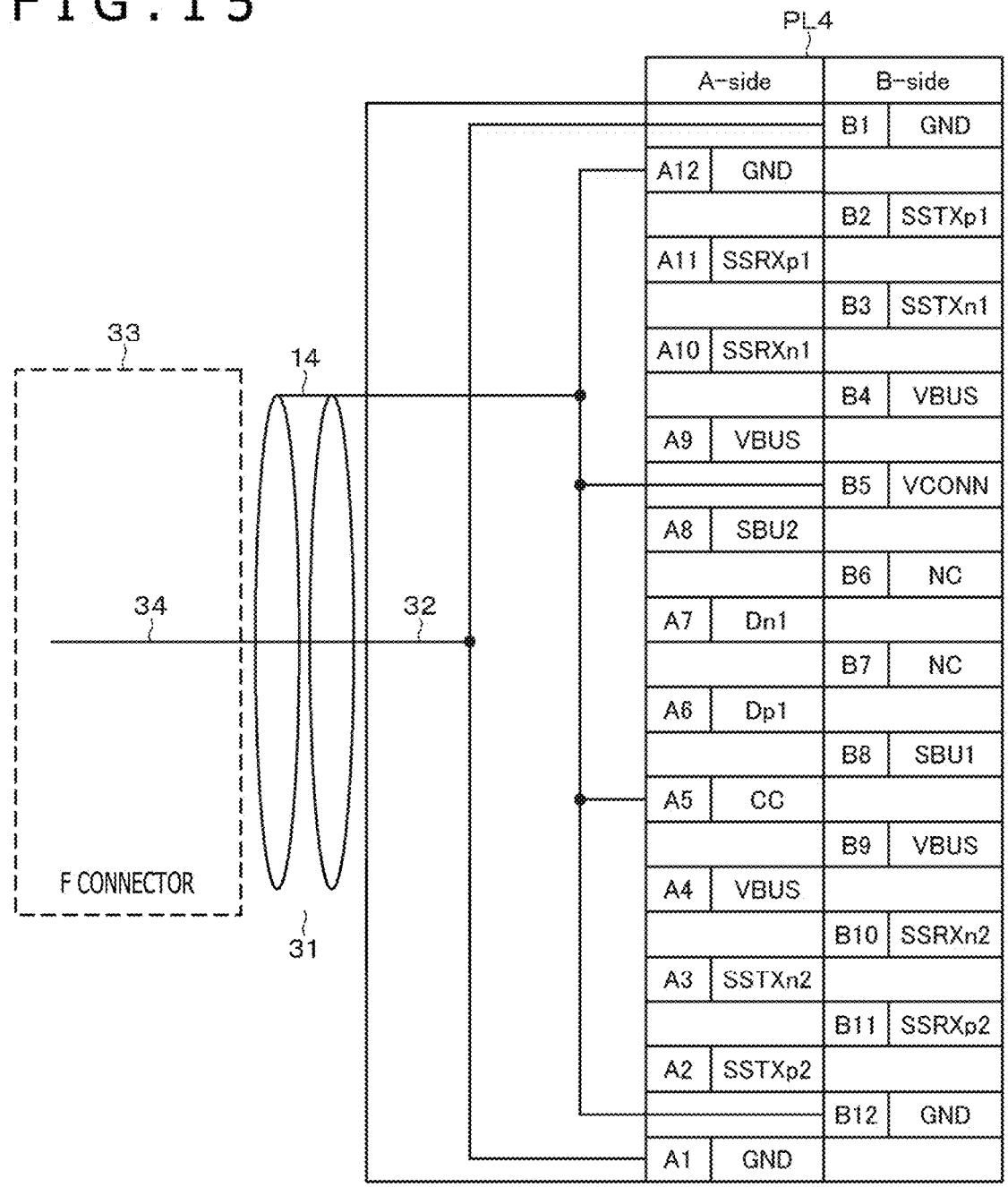
FIG. 15 is a connection diagram used to describe a cable equipped with an F connector according to the second embodiment.

Further, as illustrated in FIG. 15, the RF connector, for example, an F connector 33 can be connected to an end opposite to the plug PL4 of the coaxial cable 31 and can be connected to a television antenna mounted on the outside of housing. Specifically, a core wire of the F connector 33 is connected to a core wire of the coaxial cable 31 and the shield line 14 of the coaxial cable 31 is connected to a shield part of the F connector 33. The shield line 14 is equivalent to the antenna input line 19. The core wire of the coaxial cable 31 is connected to the pins A1 and B1 through the RF line of 50Ω, etc. The shield line 14 of the coaxial cable 31 is connected to the pins A5 (CC), A12 (GND), B5 (VCONN), and B12 (GND). In the configuration illustrated in FIG. 15, the RF line for an antenna input use is connected to the pins A1 and B1. Alternatively, the RF line can be connected to one of the pins A1 and B1.

Figure 16:
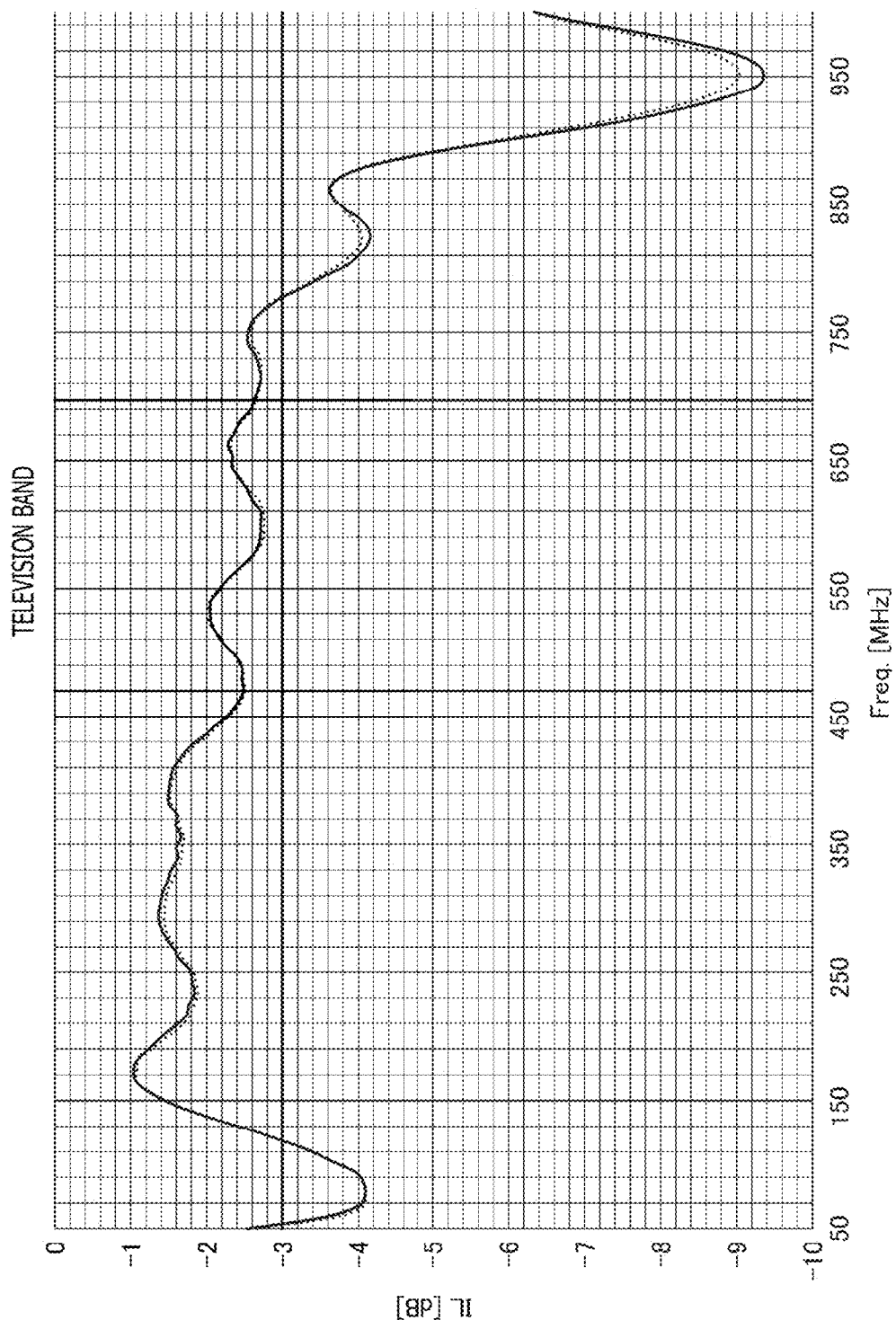
FIG. 16 is a graph indicating pass characteristics S21 obtained by a simulation of the cable illustrated in FIG. 15.

FIG. 16 is a graph indicating pass characteristics S21 obtained by the simulation of such a "USB Type-C-F connector conversion cable." The cable to be measured is a cable into which a capacitor is inserted for a lightning countermeasure and the capacitor exerts an influence as a loss in the pass characteristics. However, the loss is equal to or less than 3 dB in the television band and is a problem-free level.

3. Third Embodiment

The first and second embodiments described above are applied to an example in which a single RF signal is transmitted. By contrast, a third embodiment is applied to a case in which a plurality of RF signals are transmitted. In the case where a plurality of antennas are used such as a diversity scheme and MIMO (Multiple Input Multiple Output), it is necessary to transmit a plurality of antenna signals.

Configuration Example of a Cable According to the Third Embodiment

Figure 17:
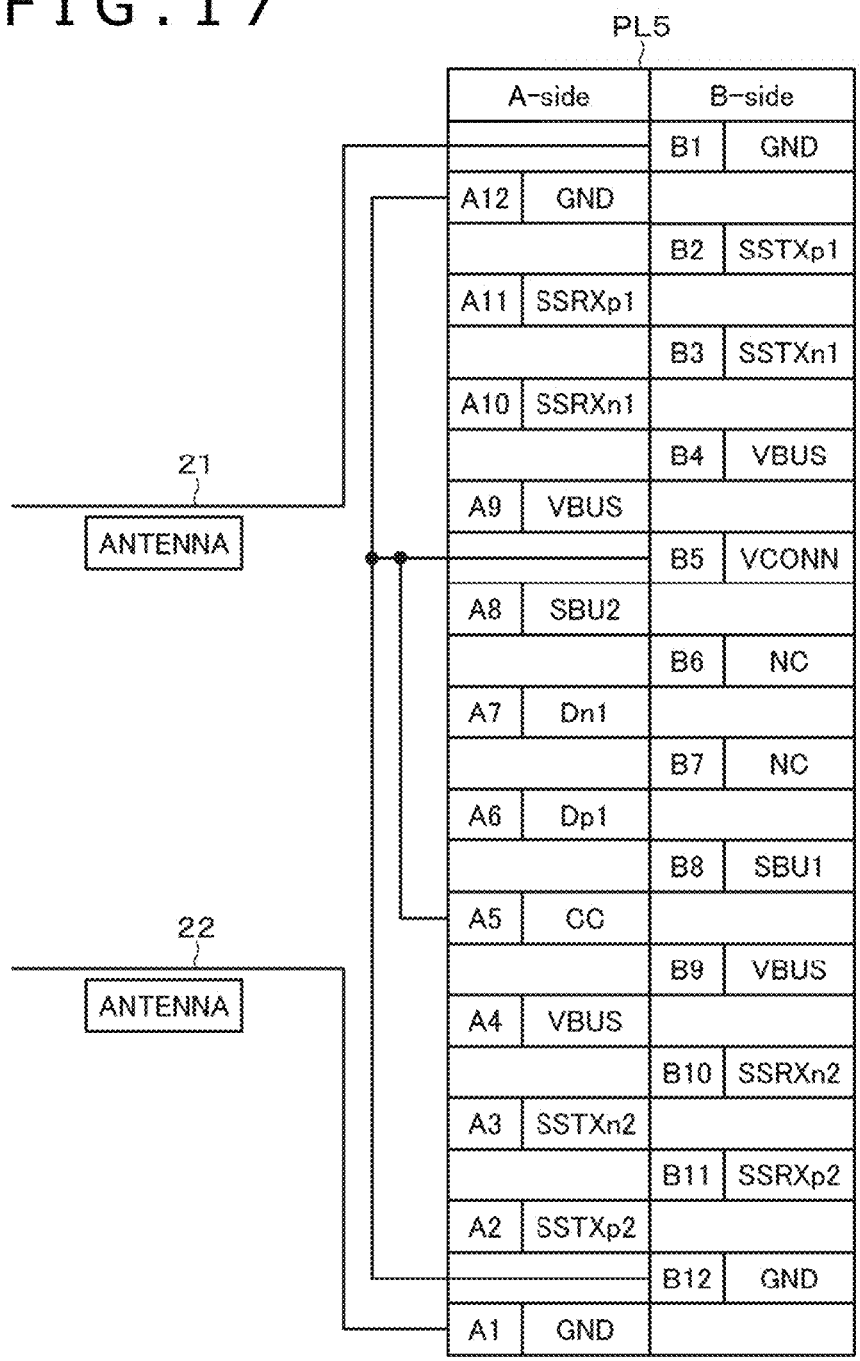
FIG. 17 is a connection diagram used to describe a cable according to a third embodiment.

FIG. 17 illustrates a configuration example (plug PL5) of a cable according to the third embodiment. The pins A5 (CC) and B5 (VCONN) of the plug PL4 are mutually connected to the pins A12 (GND) and B12 (GND) of the plug PL4 in order to recognize the audio adapter accessary mode. Although not illustrated here, a substrate is connected to the plug PL5 and two antenna signal input lines 21 and 22 are formed on the substrate. A diversity is constituted by using the two antenna signal input lines. On the substrate, one antenna signal input line 21 is connected to the pin B1 of the plug PL5. Although not illustrated here, an antenna device of approximately λ/4 (λ: wavelength of the reception frequency) of a frequency desired to be directly received is connected to the antenna signal input line 21 to constitute a monopole antenna. The other antenna signal input line 22 is connected to the pin A1 of the plug PL5. Although not illustrated here, an antenna device of approximately λ/4 (λ: wavelength of the reception frequency) of a frequency desired to be directly received is connected to the antenna signal input line 22 to constitute a monopole antenna. Note, however, that lengths of the two antenna devices are varied depending on the connected equipment, and therefore the two antenna devices need not necessarily have the length. Further, the antenna signal may be directly input to the plug PL5 through a coaxial cable. Specifically, core wires of two coaxial cables are connected to the respective antenna signal input lines 21 and 22, and the antenna signal input lines 21 and 22 are connected to the pins B1 and A1 of the plug PL5, respectively. Although not illustrated here, the shield lines of the two coaxial cables are connected to the GND pins, here, the pins A12 and B12, other than the pins B1 and A1 that are positioned in the diagonal line direction to constitute the RF line of 50Ω, etc. Further, the RF connectors, for example, F connectors can be connected to the respective ends opposite to the plug PL5 of the two coaxial cables and can be connected to respective external television antennas.

Configuration Example on the Receiver Side
According to the Third Embodiment

Figure 18:
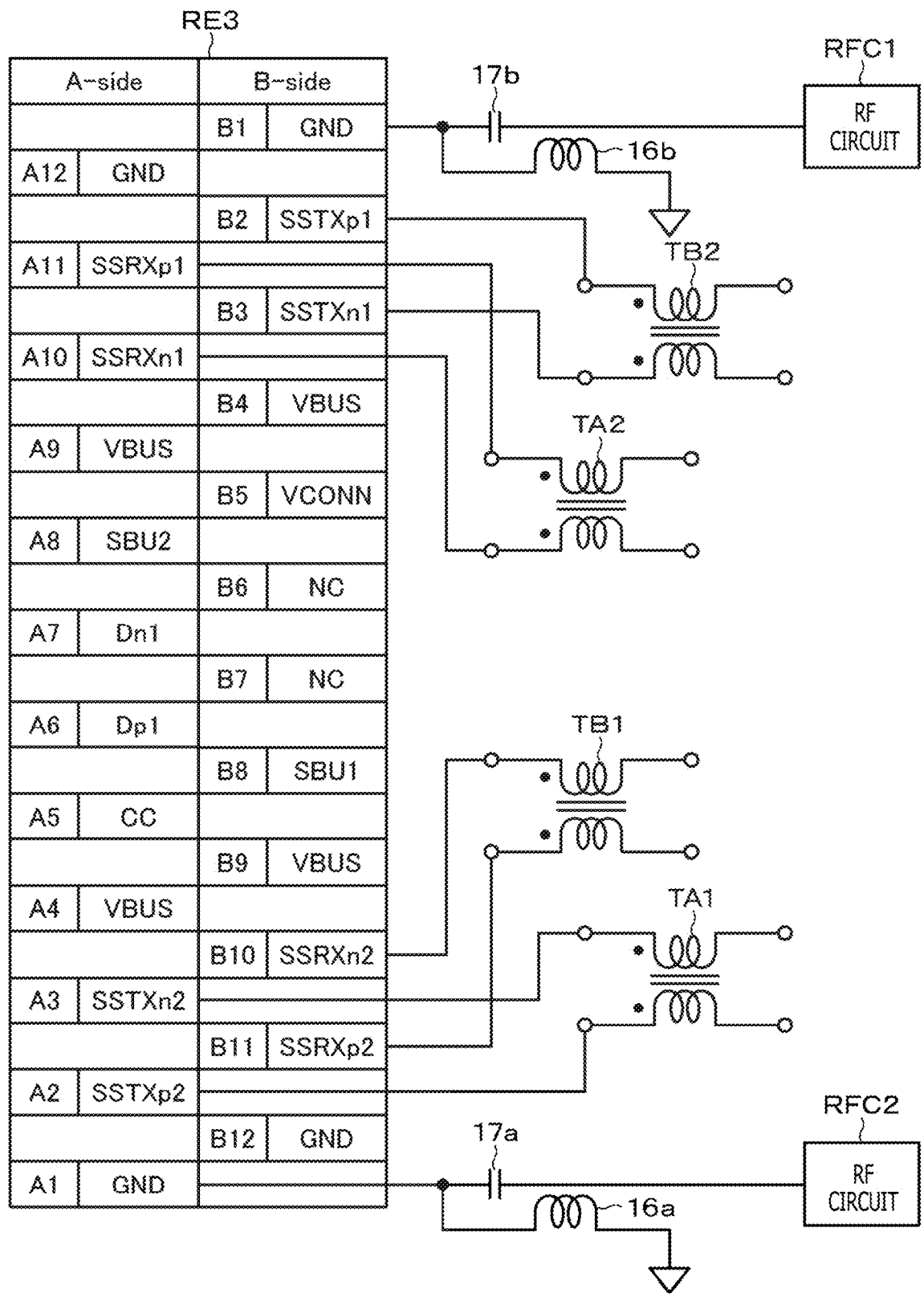
FIG. 18 is a connection diagram used to describe a configuration on a receiver side according to the third embodiment.

FIG. 18 illustrates a configuration relating to the receptacle RE3 on the receiver side. In the third embodiment of the present technology, two independent RF signals are supplied to respective one of the pins A1 (GND) and B1 (GND) that exist at the diagonal positions when viewing the receptacle (or the plug) from the front face.

The pin A1 of the receptacle RE3 is connected to an input terminal of a RF circuit RFC1 within the receiver via the capacitor 17a. The pin B1 of the receptacle RE3 is connected to an input terminal of a RF circuit RFC2 within the receiver via the capacitor 17b. The RF circuits RFC1 and RFC2 perform reception by using the diversity scheme. Note that a circuit that sets a connection between the pins A1 and B1 and the two input terminals of the RF equipment is provided in accordance with a direction (the forward connection or the reverse connection) in which the plug PL5 is connected to the receptacle RE3.

The pin A1 of the receptacle RE3 is grounded via the inductance device 16a and the pin B1 is grounded via the inductance device 16b. The inductance devices 16a and 16b are high-frequency cutoff devices such as inductors and ferrite beads with which the impedance becomes high at a desired band. The impedance of the inductance devices 16a and 16b is low other than the audio adapter accessary mode, and therefore the inductance devices 16a and 16b function as the ground.

The common mode chalk coils TA1 and TA2 are connected to the pins A2 and A3 and the pins A10 and A11, respectively, for the high-speed differential transmission approximate to the antenna input terminals (pins A1 and B1) in order to secure the isolation from the antenna input. Similarly, the common mode chalk coils TB1 and TB2 are connected to the pins B10 and B11 and the pins B2 and B3, respectively, for the high-speed differential transmission.

4. Modification Example

Although the embodiments of the present technology have been specifically described, the present technology is not limited to the above embodiments, and various modifications based on the technical idea of the present technology can be made. For example, the configurations, methods, processes, shapes, materials, numerical values, etc. included in the above-described embodiments are merely illustrative and configurations, methods, processes, shapes, materials, numerical values, etc. different from the above may be used if necessary. In the receptacle RE2 (FIG. 11) according to the second embodiment, for example, the pins A1 and B1 to which the RF signal is supplied may be mutually connected. Further, in the descriptions above, an example in which the analog audio signal is transmitted through a USB Type-C interface is described. Further, the present technology is applicable to even a case in which a D/A converter is provided in the audio accessary side and digital audio data is transmitted through the USB Type-C interface.

Note that the present technology may employ the following configurations.

(1)
A receiver including:
a connector into which a plug can be inserted in either of one state of a surface and a rear surface and another state in which the surface and the rear surface are inverted, in which
a first array including a plurality of pins and a second array including a plurality of pins are formed in the connector nearly in parallel, and
both or one of a first pin included in the first array and a second pin included in the second array and positioned at a diagonal of the first pin is set for input use of an RF signal.

(2)
The receiver according to (1) above, in which the first pin and the second pin are ground terminals.

(3)
The receiver according to (1) or (2) above, in which in a case where both the first pin and the second pin are set for input use of the RF signal, both the first pin and the second pin are connected to a ground via a high-frequency cutoff device having high impedance in a frequency band of the RF signal and are connected to an RF input terminal via a capacitor allowing the RF signal to pass through.

(4)
The receiver according to any one of (1), (2), and (3) above, in which both the first pin and the second pin are set for input use of the RF signal,
the receiver further including:
switching means that selects the RF signal from one of the first pin and the second pin and supplies the RF signal to an RF input terminal.

(5)
The receiver according to (4) above, in which
the RF signal is input to one of the first pin and the second pin, and
a level of the RF signal supplied to the RF input terminal is detected and the switching means is switched in accordance with a detection result.

(6)
The receiver according to any one of (1), (2), and (3) above, in which in a case where the RF signal is input to both the first pin and the second pin, the first pin and the second pin are connected in common and are set for input use of the RF signal.

(7)
The receiver according to any one of (1), (2), and (3) above, in which in a case where the RF signal is input to both the first pin and the second pin, one of the first pin and the second pin is set for input use of the RF signal and another of the first pin and the second pin is adjusted by an adjustment of a wiring length, an inductor, or a capacitor so as not to function as a stub including lengths of the plug and the connector in a use band.

(8)
The receiver according to any one of (1), (2), and (3) above, in which a plug specified by a USB Type-C standard can be inserted into the connector.

(9)
The receiver according to (8) above, in which an audio adapter accessary mode in which a CC pin and a VCONN pin are short-circuited and that is specified by the USB Type-C standard is used for input of the RF signal.

(10)
An RF signal supply apparatus including:
a plug that can be inserted into a connector in either of one state of a surface and a rear surface and another state in which the surface and the rear surface are inverted; and
a cable that supplies an RF signal to the plug, in which
a first array including a plurality of pins and a second array including a plurality of pins are formed in the plug nearly in parallel, and
both or one of a first pin included in the first array and a second pin included in the second array and positioned at a diagonal of the first pin is set for supply use of the RF signal.

(11)
The RF signal supply apparatus according to (10) above, in which the cable has a function of an antenna, and an output of the antenna is supplied as the RF signal to both or one of the first pin and the second pin.

(12)
The RF signal supply apparatus according to (10) or (11), in which the plug is specified by a USB Type-C standard.

(13)
The RF signal supply apparatus according to any one of (10), (11), and (12) above, in which a jack for headset connection use is connected to the cable.

(14)
The RF signal supply apparatus according to any one of (10), (11), and (12) above, in which a connector for RF signal transmission use is connected to the cable.

REFERENCE SIGNS LIST

RE, RE1 to RE3 Receptacle
PL, PL1 to PL5 Plug
RFC, RFC1, RFC2 RF circuit
11 Jack
13 Detection switch
14 Shield line
18 Switch
20 Stub

The invention claimed is:
1. A receiver comprising:
a connector into which a plug is reversibly insertable in a first orientation or a second orientation inverted from the first orientation;
a plurality of pins attached to the connector, the pins comprising:
a first array including a plurality of first pins, and
a second array including a plurality of second pins arranged nearly in parallel to the first pins of the first array; and
a pin determination circuit,
wherein a subset of the first and second pins of the first and second arrays are configured as paired pins, one from each of the first and second arrays, such that signals transmitted via the first and second pins of the paired pins are not affected by whether the connector is connected to the plug in the first orientation or the second orientation,
wherein at least two of the first pins of the first array are not paired with any of the second pins of the second array, and at least two of the second pins of the second array are not paired with any of the first pins of the first array, such that one or more signals transmitted via any of the at least two of the first pins and the at least two of the second pins is affected by whether the connector is connected to the plug in the first orientation or the second orientation,
wherein the pin determination circuit determines whether the connector is connected to the plug in the first orientation or the second orientation based on a detection from any one or any combination of the at least two of the first pins and the at least two of the second pins, and specifies a function of any one or any combination of the at least two of the first pins and the at least two of the second pins based on a determination result, and
wherein both or one of a first pin included in the first array and a second pin included in the second array and positioned diagonally relative to the first pin is set for transmission of an RF signal.

2. The receiver according to claim 1, wherein the first pin and the second pin are ground terminals.

3. The receiver according to claim 1, wherein in a case where both the first pin and the second pin are set for transmission of the RF signal, both the first pin and the second pin are connected to a ground via a high-frequency cutoff device having high impedance in a frequency band of the RF signal and are connected to an RF input terminal via a capacitor such that the RF signal is allowed to pass through.

4. The receiver according to claim 1, wherein
both the first pin and the second pin are set for input use of the RF signal, and
the receiver further comprises:
a switch configured to select the RF signal from one of the first pin and the second pin and to supply the RF signal to an RF input terminal.

5. The receiver according to claim 4, wherein
the RF signal is input to one of the first pin and the second pin, and
a level of the RF signal supplied to the RF input terminal is detected and the switch is switched in accordance with a detection result.

6. The receiver according to claim 1, wherein in a case where the RF signal is input to both the first pin and the second pin, the first pin and the second pin are connected in common and are set for transmission of the RF signal.

7. The receiver according to claim 1, wherein in a case where the RF signal is input to both the first pin and the second pin, one of the first pin and the second pin is set for transmission of the RF signal and another of the first pin and the second pin is adjusted by an adjustment of a wiring length, an inductor, or a capacitor so as not to function as a stub.

8. The receiver according to claim 1, wherein the plug is specified by a USB Type-C standard.

9. The receiver according to claim 8, wherein an audio adapter accessory mode in which a CC pin and a VCONN pin are short-circuited and that is specified by the USB Type-C standard is used for input of the RF signal.

10. An RF signal supply apparatus comprising:
a plug configured to be reversibly insertable into a connector in a first orientation or a second orientation inverted from the first orientation;
a plurality of pins attached to the plug; and
a cable that supplies an RF signal to the plug,
wherein the pins comprise:
a first array including a plurality of first pins, and
a second array including a plurality of second pins arranged nearly in parallel to the first pins of the first array,
wherein a subset of the first and second pins of the first and second arrays are configured as paired pins, one from each of the first and second arrays, such that signals transmitted via the first and second pins of the paired pins are not affected by whether the plug is connected to the connector in the first orientation or the second orientation,
wherein at least two of the first pins of the first array are not paired with any of the second pins of the second array, and at least two of the second pins of the second array are not paired with any of the first pins of the first array, such that one or more signals transmitted via any of the at least two of the first pins and the at least two of the second pins is affected by whether the plug is connected to the connector in the first orientation or the second orientation, and
wherein both or one of a first pin included in the first array and a second pin included in the array and positioned at a diagonal of the first pin is set for transmission of the RF signal.

11. The RF signal supply apparatus according to claim 10, wherein the cable has a function of an antenna, and an output of the antenna is supplied as the RF signal to both or one of the first pin and the second pin.

12. The RF signal supply apparatus according to claim 10, wherein the plug is specified by a USB Type-C standard.

13. The RF signal supply apparatus according to claim 10, wherein a jack configured for headset connection use is connected to the cable.

14. The RF signal supply apparatus according to claim 10, wherein an RF connector configured for RF signal transmission use is connected to the cable.

* * * * *